United States Patent
Anderson et al.

(10) Patent No.: US 9,457,988 B1
(45) Date of Patent: Oct. 4, 2016

(54) ELEVATOR STRUCTURE AND BRAKE SYSTEM THEREFOR

(71) Applicants: Paul Anderson, Cincinnati, OH (US); Thomas R Aultz, Loveland, OH (US); Timothy J. Beitz, Hamilton, OH (US); Scott Kim Thompson, Aurora, IN (US)

(72) Inventors: Paul Anderson, Cincinnati, OH (US); Thomas R Aultz, Loveland, OH (US); Timothy J. Beitz, Hamilton, OH (US); Scott Kim Thompson, Aurora, IN (US)

(73) Assignee: Federal Equipment Company, Cincinnati, OH (US)

( * ) Notice: Subject to any disclaimer, the term of this patent is extended or adjusted under 35 U.S.C. 154(b) by 334 days.

(21) Appl. No.: 13/837,706

(22) Filed: Mar. 15, 2013

Related U.S. Application Data

(63) Continuation-in-part of application No. 12/766,463, filed on Apr. 23, 2010.

(60) Provisional application No. 61/172,282, filed on Apr. 24, 2009.

(51) Int. Cl.
| | |
|---|---|
| *B66B 5/16* | (2006.01) |
| *B66B 9/08* | (2006.01) |
| *B66B 11/04* | (2006.01) |
| *F16H 25/20* | (2006.01) |

(52) U.S. Cl.
CPC ............... *B66B 5/16* (2013.01); *B66B 9/0838* (2013.01); *B66B 11/0407* (2013.01); *B66B 11/0446* (2013.01); *F16H 25/2003* (2013.01)

(58) Field of Classification Search
CPC ............. B66B 5/02; B66B 5/16; B66B 5/18; B66B 9/02; B66B 9/025; B66B 9/0838; B66B 11/0407; B66B 11/0446; F16H 2019/046; F16H 25/2003
See application file for complete search history.

(56) References Cited

U.S. PATENT DOCUMENTS

| | | |
|---|---|---|
| RE2,003 E | 6/1865 | Miller |
| 273,273 A | 3/1883 | Greenwood |
| 307,985 A | 11/1884 | Phyfe et al. |
| 327,048 A | 9/1885 | Wittram |
| 381,492 A | 4/1888 | Blickensderfer et al. |
| 561,679 A | 6/1896 | Martin et al. |
| 614,705 A | 11/1898 | Dissosway |
| 655,837 A | 8/1900 | Sterzing |
| 795,965 A | 8/1905 | Fullenlove |
| 823,720 A | 6/1906 | Fullenlove |
| 832,113 A | 10/1906 | Worthington |
| 856,576 A | 6/1907 | Fullenlove |
| 885,560 A | 4/1908 | Worthington |
| 959,778 A | 5/1910 | Melander |
| 1,113,744 A | 10/1914 | Bjorkstrom |
| 1,392,078 A | 9/1921 | Ouillett |
| 2,527,897 A | 10/1950 | Todd |
| 3,415,343 A | 12/1968 | Svensson |

(Continued)

*Primary Examiner* — Minh Truong
(74) *Attorney, Agent, or Firm* — Hasse & Nesbitt LLC; Daniel F. Nesbitt

(57) ABSTRACT

A braking system and method for an apparatus or vehicle moved along a pathway by an apparatus drive mechanism, for halting the movement of the apparatus or vehicle in the event that the drive mechanism loses power or malfunctions. A conveyance system includes a pathway, an moving apparatus moving along the pathway, the apparatus drive mechanism, a brake rail along the pathway having along one edge a multiplicity of regularly spaced teeth with gaps between successive teeth, and a brake device mounted securely to the apparatus. The brake device includes a rotatably driven rotor having outer helical threads for running the gaps in the brake rail with successive turns of the driven rotor without touching the teeth.

5 Claims, 12 Drawing Sheets

(56) References Cited

U.S. PATENT DOCUMENTS

| | | | |
|---|---|---|---|
| 3,468,401 | A | 9/1969 | Letz |
| 3,881,575 | A | 5/1975 | Manaugh |
| 4,102,437 | A | 7/1978 | Mandel |
| 4,128,142 | A | 12/1978 | Satoh et al. |
| 4,402,386 | A | 9/1983 | Ficheux et al. |
| 4,768,621 | A | 9/1988 | Kunii |
| 4,898,044 | A | 2/1990 | Galloway |
| 4,919,236 | A | 4/1990 | Karlsson et al. |
| 4,923,055 | A | 5/1990 | Holland |
| 5,007,505 | A | 4/1991 | Lindegger |
| 5,033,587 | A | 7/1991 | Nakai et al. |
| 5,141,082 | A | 8/1992 | Ishii et al. |
| 5,158,156 | A | 10/1992 | Okuma et al. |
| 5,183,980 | A | 2/1993 | Okuma et al. |
| 5,202,539 | A | 4/1993 | Lamb |
| 5,235,145 | A | 8/1993 | Olsen et al. |
| 5,339,704 | A | 8/1994 | Lindberg |
| 5,377,786 | A | 1/1995 | Nakagawa |
| 5,393,941 | A | 2/1995 | Mizuno et al. |
| 5,400,204 | A | 3/1995 | Oshima et al. |
| 5,495,919 | A | 3/1996 | Ericson et al. |
| 5,518,087 | A | 5/1996 | Hwang et al. |
| 5,547,059 | A * | 8/1996 | Watanabe et al. ............ 187/289 |
| 5,579,869 | A | 12/1996 | Ishii et al. |
| 5,669,469 | A | 9/1997 | Ericson et al. |
| 5,717,174 | A | 2/1998 | Ramos |
| 5,751,076 | A | 5/1998 | Zhou |
| RE36,034 | E | 1/1999 | Sheridan |
| 6,131,704 | A | 10/2000 | Viita-Aho et al. |
| 6,189,657 | B1 | 2/2001 | Jessenberger |
| 6,305,501 | B1 | 10/2001 | Kahkipuro et al. |
| 6,374,964 | B2 | 4/2002 | Mustalahti et al. |
| 6,554,107 | B2 | 4/2003 | Yumura et al. |
| 6,598,708 | B2 | 7/2003 | St-Germain et al. |
| 6,675,939 | B2 | 1/2004 | Maurice et al. |
| 6,952,086 | B1 | 10/2005 | Krefta et al. |
| 7,036,638 | B2 | 5/2006 | Simmonds et al. |
| 7,059,451 | B2 | 6/2006 | Richey et al. |
| 7,261,186 | B2 | 8/2007 | Deplazes et al. |
| 8,430,212 | B2 | 4/2013 | Ueda et al. |
| 2005/0056493 | A1 | 3/2005 | Molnar et al. |
| 2008/0264729 | A1 | 10/2008 | Mustalahti et al. |

* cited by examiner

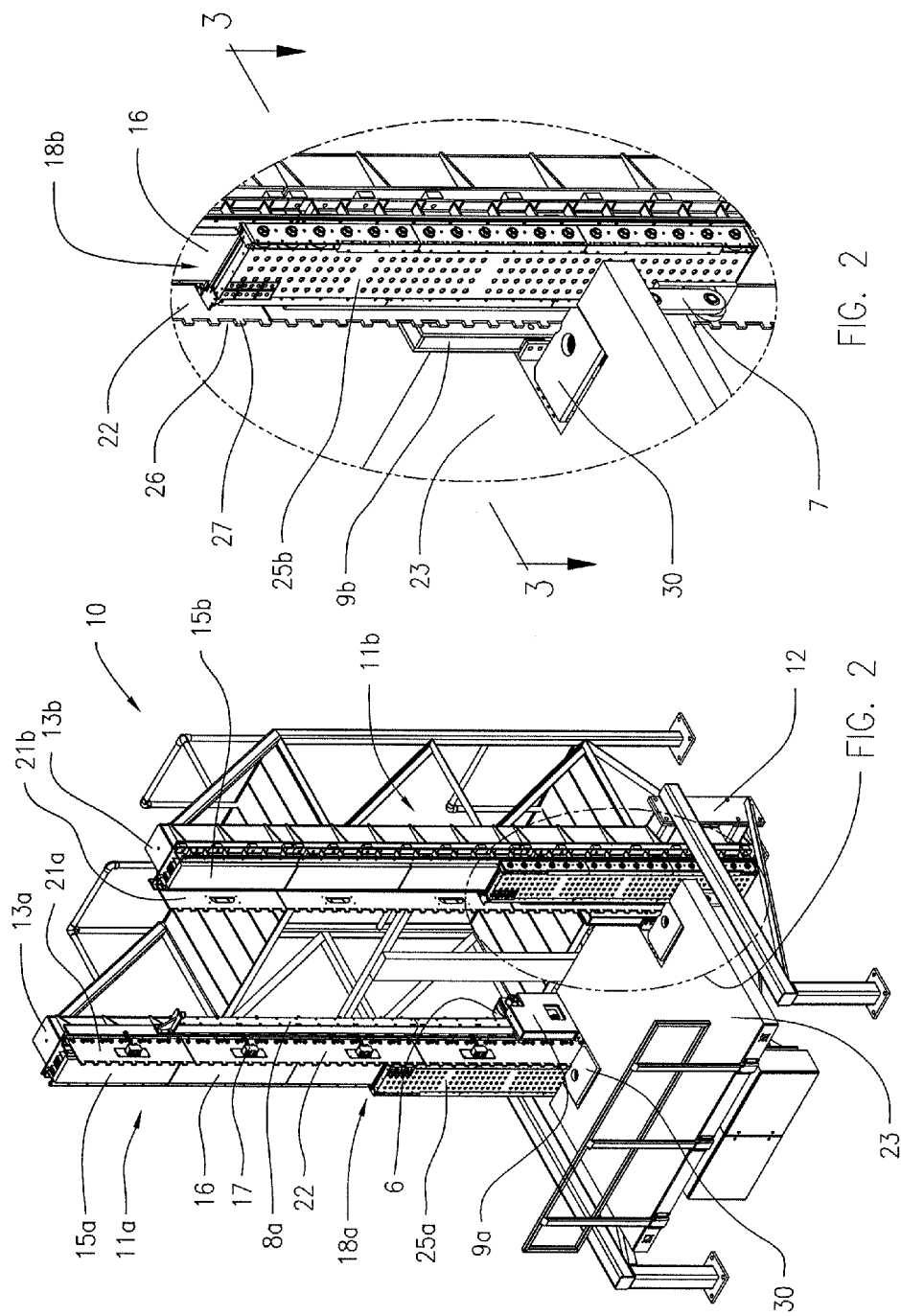

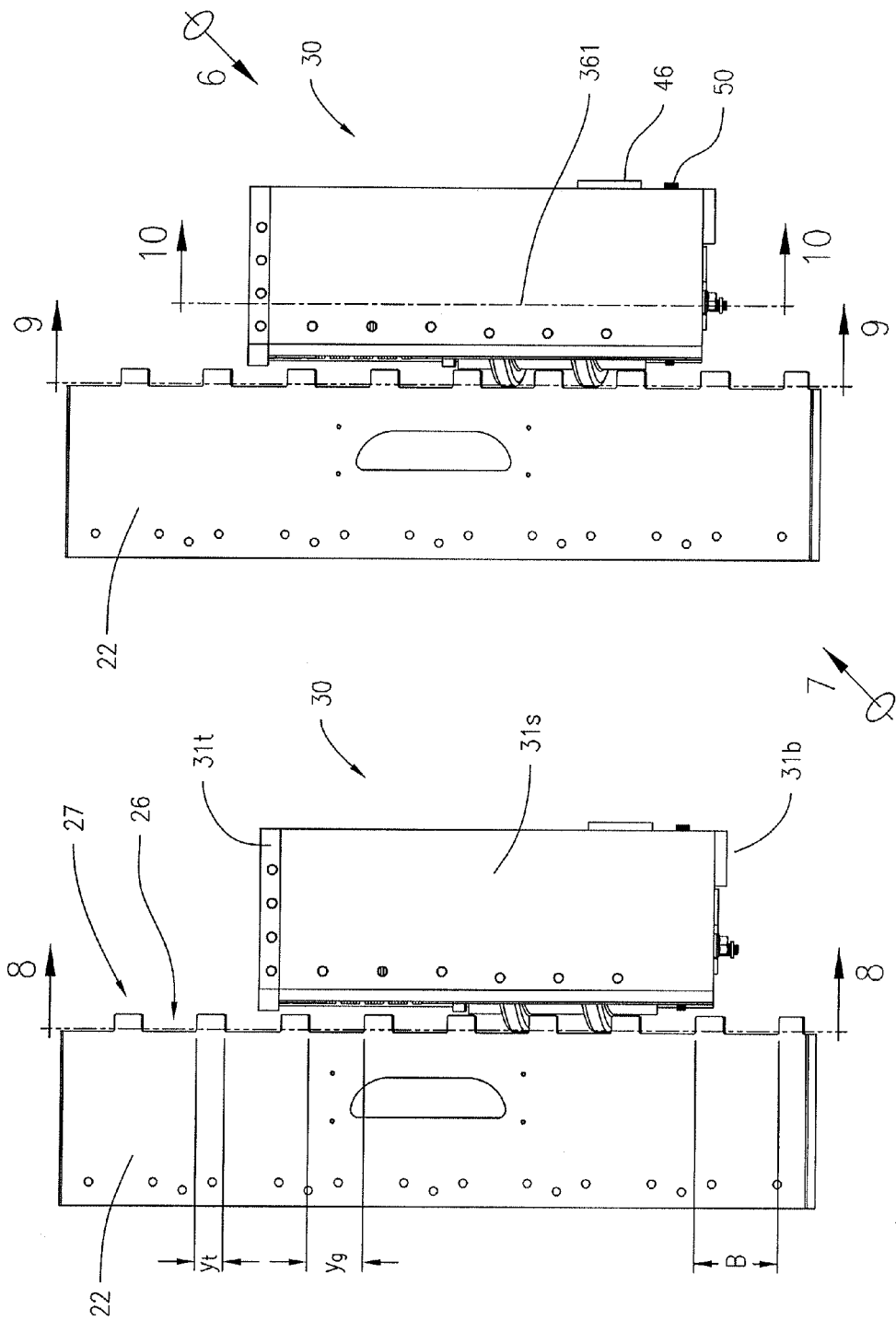

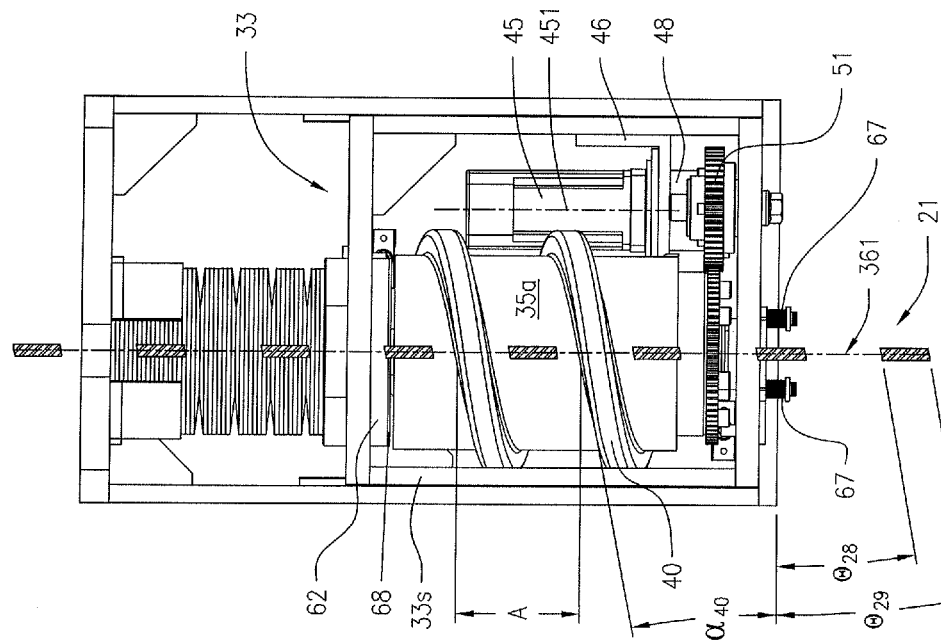
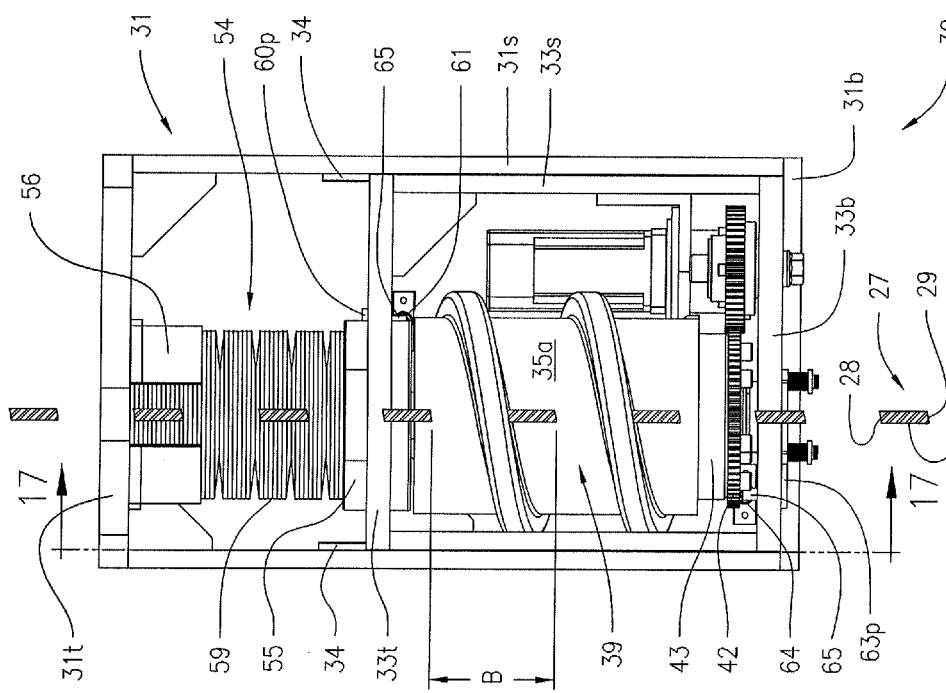

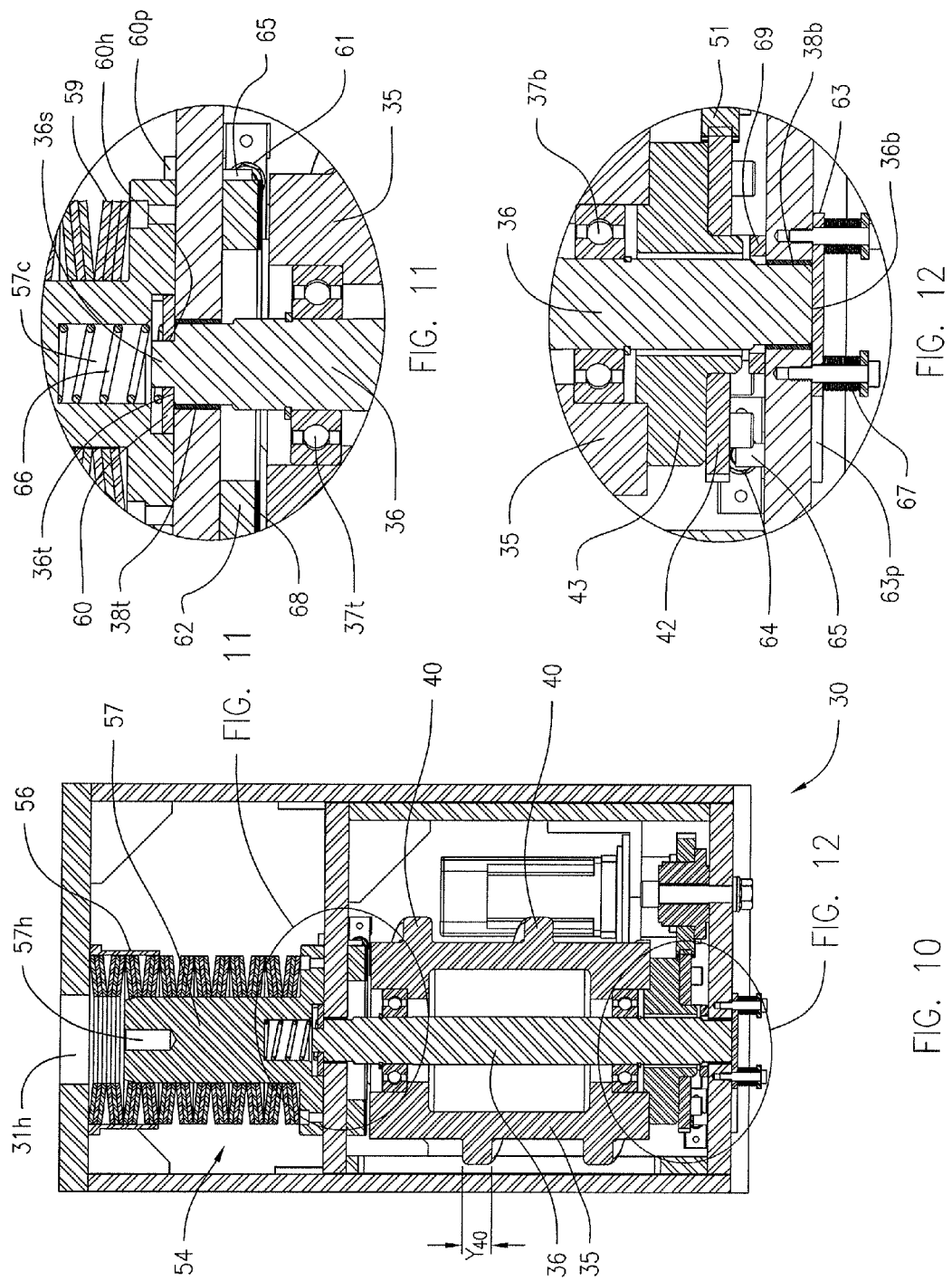

ELEVATOR STRUCTURE AND BRAKE SYSTEM THEREFOR

CROSS-REFERENCE TO RELATED APPLICATIONS

The present application is a continuation in part application of U.S. application Ser. No. 12/766,463, filed Apr. 23, 2010, which claims the benefit of U.S. Provisional Application 61/172,282 filed Apr. 24, 2009, the disclosures of which are incorporated herein by reference.

TECHNICAL FIELD

The present invention relates generally to vertical conveyance equipment, such as elevator structures, and more particularly to a programmable servo motor control system for moving an elevator platform and a servo controlled brake device for an elevator platform.

BACKGROUND OF THE INVENTION

A primary consideration in the design and construction of vertical conveyance equipment, such as an elevator system, resides in the safety of operation of the system. Accordingly, a reliable braking system for an elevator system that can effectively stop and hold the elevator car in case of power loss, mechanical or electrical malfunction or other emergency is critical. Strict governmental regulations regarding the safety of elevator systems are therefore widespread. Braking systems in use have employed various mechanical, electrical or magnetic devices for accomplishing effective braking control for the elevator. One such device is a clamp type rail brake that grips a guide rail wherein pressure of the braking surfaces is produced by spring force, and is often used as a safety brake to stop an elevator platform in case of excessive upward or downward speed. Other braking systems have used drum brakes and disk brakes that engage the drive shaft of the elevator motor, or spring-biased brake shoes acting on the elevator traction sheave or hoisting cables, or clamp type brakes in elevators with linear motors, or incorporating electromagnetic holding elements. Some examples of elevator brake mechanisms may be found by reference to U.S. Pat. No. 4,923,055 to Holland, U.S. Pat. No. 5,007,505 to Lindegger, U.S. Pat. No. 5,202,539 to Lamb, U.S. Pat. No. 5,495,919 to Ericson et al, U.S. Pat. No. 5,518,087 to Hwang et al, U.S. Pat. No. 5,669,469 to Ericson et al, U.S. Pat. No. 5,717,174 to Ramos, U.S. Pat. No. 6,131,704 to Viita-Aho et al, U.S. Pat. No. 6,374,964 to Mustalahti et al, U.S. Pat. No. 6,675,939 to Maurice et al, U.S. Pat. No. 7,036,638 to Simmonds et al, U.S. Pat. RE36,034 to Sheridan, and U.S. Patent Pub 2008/0264727 by Mustalahti et al (the disclosures of all of which are incorporated herein by reference).

A common characteristic among conventional elevator braking systems, including those just referenced, is that the holding mechanism typically involves friction between the elements of each braking system and the supporting structures or the driving mechanisms of the elevator system. Additionally, many prior art braking systems operate only for elevator motion in the downward direction.

SUMMARY OF THE INVENTION

The present invention relates to a braking system for an apparatus or vehicle moving along a pathway. The pathway typically has predefined coordinates and direction. The pathway can be vertical or non-vertical (that is, horizontal or inclined) and can be linear or curvilinear. The apparatus or vehicle is moved along the pathway by an apparatus drive mechanism. The braking system is typically an emergency braking system that is intended to halt the movement of the apparatus or vehicle in the event that the apparatus drive mechanism loses power or malfunctions. In methods and systems that also employ conventional braking system for the particular apparatus or vehicle, the braking system of the present invention can halt the movement of the apparatus or vehicle in the event the conventional braking system loses operational power or malfunctions.

In an aspect of the present invention, a conveyance system is provided, comprising a structure defining a pathway; an apparatus supported for movement along the pathway; an apparatus drive mechanism operatively connected to the apparatus for moving the apparatus along the pathway; a brake rail having along one edge thereof a multiplicity of regularly spaced teeth that define gaps between successive teeth, the brake rail disposed along the pathway and secured to the structure, a brake device mounted securely to the apparatus, the brake device including a rotor having a central axis of rotation and an outer cylindrical surface, and a helical thread on the outer cylindrical surface of the rotor for loosely engaging the gaps in the brake rail, the thread having a width and helical pitch whereby with successive turns of the rotor, the thread loosely engages successive gaps in the brake rail for movement of the rotor along the brake rail, and a rotor drive device for rotating the rotor along the brake rail simultaneously with the expected vertical movement of the apparatus.

In another aspect of the present invention, a vertical conveyance system, such as an elevator structure, is provided having one or more vertically disposed columns defining a vertical pathway, and a vertically movable platform or vehicle operatively connected to the columns. An apparatus drive mechanism, including a linear synchronous motor, interconnects each column and the platform for moving the platform vertically. A vertically disposed brake rail is attached to each column, each brake rail having along one vertical edge thereof a multiplicity of regularly spaced teeth that define gaps between successive teeth. At least one brake device is secured to the platform, the brake device including a rotor having an outer cylindrical surface and a central axis of rotation, and a helical thread on the outer cylindrical surface of the rotor for loosely engaging the gaps in the brake rail. The helical thread has a width and helical pitch whereby with successive turns of the rotor, the thread loosely engages successive gaps between adjacent teeth on the brake rail as the platform moves vertically along the brake rail. A rotor drive device, including a motor, is operatively connected to the rotor for rotatably driving the rotor whereby the revolving thread is driven through successive gaps along the brake rail simultaneously with vertical movement of the platform. A synchronizing control means, a controller, or a control system, including a programmable logic controller system, is operatively connected to each apparatus drive mechanism and brake device for controlling vertical movement of the platform along the brake rail and also independently controlling rotative movement of the rotor and the revolving thread.

In another aspect of the present invention, the conveyance system can operate along a horizontal or inclined pathway, which can be linear or curvilinear, and which includes a brake rail disposed along, and typically secured along, the pathway. An apparatus or vehicle configured for conveyance along the pathway includes at least one brake device secured to the apparatus or vehicle, which is disposed in synchronizing association with the brake rail as described herein.

The invention further relates to a vertical conveyance system, comprising, structure defining a vertically disposed elevator shaft; a vertically movable platform disposed within the shaft; an apparatus drive mechanism operatively connected to the platform for moving the platform vertically within the shaft; at least one vertically disposed brake rail attached to the structure, each the brake rail having along one vertical edge thereof a multiplicity of regularly spaced teeth that define gaps between successive teeth; at least one brake device secured to the platform, the brake device including a rotor having an outer cylindrical surface and a central axis of rotation, the rotor further having a helical thread on the outer cylindrical surface for loosely engaging the gaps in the brake rail, the thread having a width and helical pitch, the brake device further including a servo motor operatively connected to the rotor for rotatably driving the rotor; and, a control means, including a controller or a control system, operatively connected to the apparatus drive mechanism and each the servo motor for controlling vertical movement of the platform along the brake rail independent of rotative movement of the rotor, whereby with successive rotations of the rotor, the thread loosely engages successive the gaps, and remains out of contact with the teeth, in the brake rail during as long as vertical movement of the platform along the brake rail is synchronous with rotative movement of the rotor.

The invention also relates to a brake system for movable conveyance equipment, comprising: a brake rail, having along one edge thereof a multiplicity of regularly spaced teeth that define gaps between successive teeth; a mounting frame disposed for movement along the brake rail; and a brake device secured to the mounting frame, the brake devices including a rotor having a central axis of rotation and an outer surface, a helical thread on the outer surface for loosely engaging the gaps in the brake rail, the thread having a width and helical pitch, and a servo motor operatively connected to the rotor for rotatably driving the rotor, whereby with successive controlled rotation of the rotor, the thread loosely engages successive gaps in brake rail during synchronous vertical movement of the mounting frame along the brake rail with the conveyance equipment.

The invention also relates to the brake system for vertically and non-vertically movable conveyance equipment or vehicles. The brake device can further include a servo motor operatively connected to the rotor for rotatably driving the rotor, whereby with successive controlled rotation of the rotor, the thread loosely engages successive the gaps in the brake rail during synchronous vertical movement of the mounting frame along the brake rail with the conveyance equipment.

The invention further relates to an elevator system, comprising, structure defining an elevator shaft; a platform supported for vertical movement within the shaft along the structure; an apparatus drive mechanism operatively connected to the platform for moving the platform vertically within the shaft; at least one brake rail having along one vertical edge thereof a multiplicity of regularly spaced teeth that define gaps between successive teeth, the brake rail disposed vertically and secured to the shaft structure; a brake device mounted to the platform, the brake device including a rotor having an outer cylindrical surface and a central axis of rotation, the rotor further having a helical shaped thread on the outer cylindrical surface for loosely engaging the gaps in the brake rail, the thread having a width and helical pitch angle whereby with successive turns of the rotor, the thread loosely engages successive the gaps in the brake rail for vertical movement of the rotor along the brake rail, the brake device further including a servo motor operatively connected to the rotor for controlled rotation of the rotor; wherein the brake device is controllable between a first rotating condition of the rotor with the thread advancing vertically out of contact with the teeth on the brake rail, and a second stationary condition wherein the thread rests on and in contact with at least one tooth of the brake rail.

The invention further relates to a method for operating a movable apparatus along a structure that defines a pathway, the movable apparatus supported for movement along the pathway the shaft, comprising the steps of: providing a brake rail secured to the structure along the pathway, the brake rail having along one edge thereof a multiplicity of regularly spaced teeth that define gaps between successive teeth; providing a brake device secured to the movable apparatus, the brake device including a rotor having an outer cylindrical surface and a central axis of rotation, and including a helical thread on the outer cylindrical surface for loosely engaging the gaps in the brake rail, moving under power the movable apparatus along the pathway; and independently rotating the rotor in synchronization with the expected movement of the movable apparatus, whereby the thread loosely engages successive gaps in the brake rail so long as the motions remain in synchronization.

The invention further relates to an improved method for operating vertical conveyance equipment, such as an elevator system, having structure defining a vertically disposed elevator shaft, and a vertically movable platform disposed within the shaft, comprising the steps of, providing an apparatus drive mechanism operatively connected to the vertically movable platform for moving the platform vertically within the shaft; providing at least one vertically disposed brake rail to the structure defining the shaft, each the brake rail having along one vertical edge thereof a multiplicity of regularly spaced teeth that define gaps between successive teeth; securing at least one brake device to the platform, each the brake device including a rotor having an outer cylindrical surface and a central axis of rotation, the rotor further having a helical thread on the outer cylindrical surface for loosely engaging the gaps in the brake rail, the thread having a width and helical pitch, the brake device further including a servo motor operatively connected to the rotor for rotatably driving the rotor; and, controlling vertical movement of the platform along the brake rail simultaneously and independently with controlled rotation of the rotor using a controller or a control system, operatively connected to the apparatus drive mechanism and the servo motor whereby with successive rotations of the rotor, the thread loosely engages successive the gaps in the brake rail during synchronized vertical movement of the platform along the brake rail.

The invention also relates to a vertical conveyance system and method for operating a vertical conveyance system wherein the control means includes a programmable logic controller system.

The invention also relates to a brake device for a vertically movable platform that provides an engagement brake element that continuously confronts a brake stop element along the vertical path of movement as the platform moves.

A notable advantage of the present invention is the use of a brake apparatus which, if power to the elevator lift and movement drives is suddenly lost, the elevator structure will free fall only the short distance between a tooth of the brake rail and the helical thread of the rotatable brake device. As such, the brake device serves an as emergency brake to prevent rapid descending of the platform in the event of a power outage.

Another notable advantage of the present invention is the use of a brake apparatus and control means which may readily be employed to positively locate and support the elevator during normal halting at an operator selected level, eliminating the need for separate operating and emergency braking devices.

Other aspects, advantages and objects of the invention will become apparent as a detailed description of representative embodiments of the invention proceeds.

BRIEF DESCRIPTION OF THE DRAWINGS

The invention will be more clearly understood from the following detailed description of representative embodiments thereof read in conjunction with the accompanying drawings that form a part of this disclosure.

FIG. 1 is a perspective view of an exemplary elevator shaft structure according to the invention.

FIG. 2 is an enlargement area of a typical column in FIG. 1 showing the brake device.

FIG. 4 a side elevation view of the brake apparatus illustrating the engagement of the brake apparatus with the brake rail in the "Ready for Lift-Off" state.

FIG. 5 is a side elevation view of the brake apparatus illustrating the engagement of the brake apparatus with the brake rail in the "Lifted Off" state.

FIG. 8 is a cutaway elevation view through the brake rail with the brake apparatus in the "Ready for Liftoff" state.

FIG. 9 is a cutaway elevation view through the brake rail with the brake apparatus in the "Lifted off" state.

FIG. 10 is a cutaway elevation view through the brake rotor assembly of the brake apparatus to illustrate certain internal components of the brake device.

FIG. 11 is an enlargement area of the top of the brake rotor assembly in FIG. 10.

FIG. 12 is an enlargement area of the bottom of the brake rotor assembly in FIG. 10.

FIGS. 19a and 19b show the overload spring assembly 230 of the cushioning device of FIG. 18, a) in an installation configuration, and b) in an operational configuration, respectively.

DETAILED DESCRIPTION OF THE INVENTION

Figure 3:
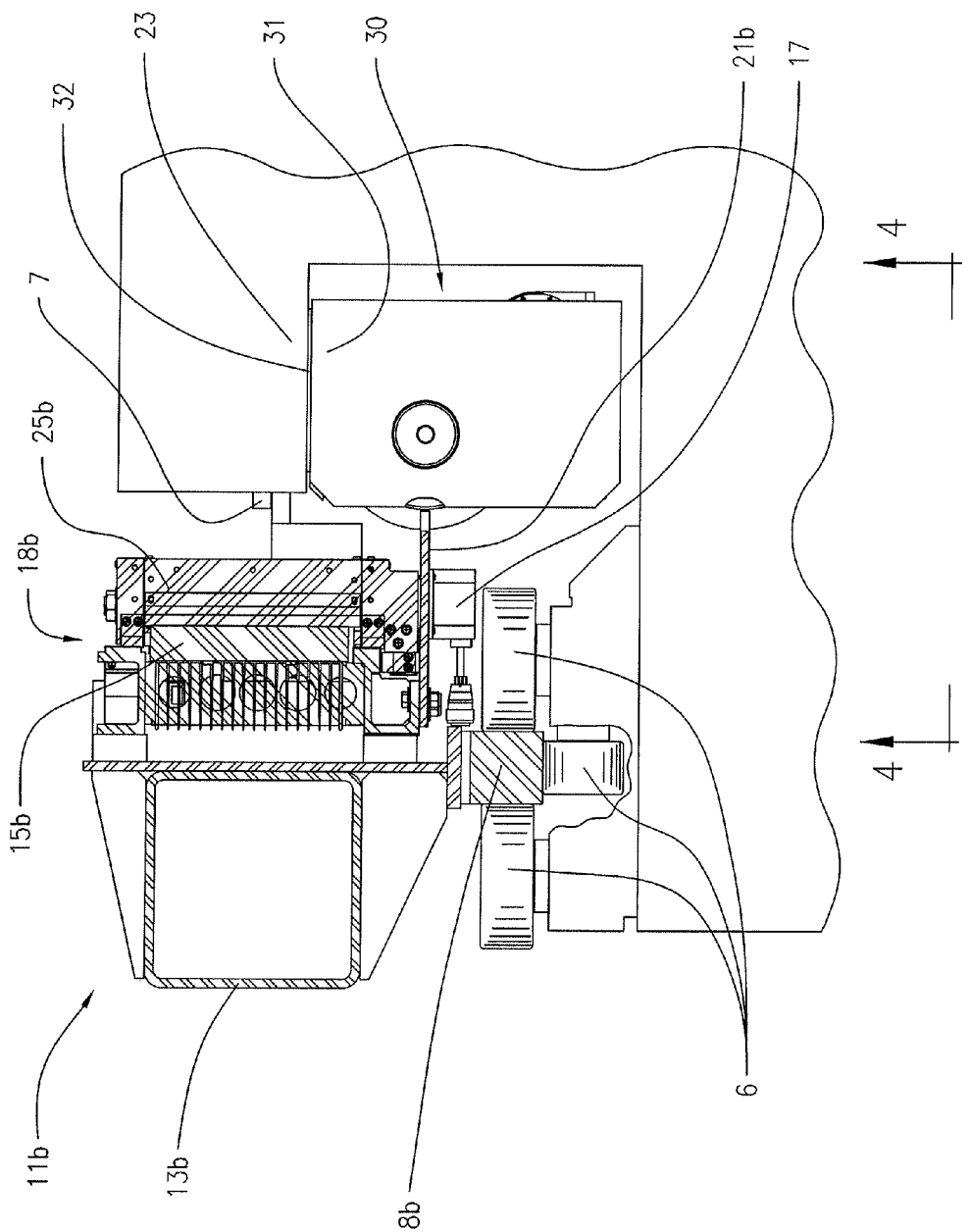
FIG. 3 is a typical plan view representation at each column connection showing the brake apparatus.

A thread of the rotor is defined to "loosely engage" within the successive gaps by advancing into and through the successive gaps, wherein the thread in normal operation typically does not contact the tooth above or the tooth below the gaps, although the thread may contact the tooth above or the tooth below the gaps but only with a minimum of force, and more particularly with a minimum force that is less than a force sufficient to cause vertical displacement of the brake rotor within the brake device, for reasons discussed herein below.

A thread that loosely engages with successive gaps includes a thread that "engages" within the successive gaps, which means that during operation of the device, the threads advance into and through the gap in the brake blade without touching the tooth either above or below the gap, although the thread may move forwardly or rearwardly within the space of the gap.

A thread that engages with successive gaps includes a thread that "registers" within the successive gaps, which means that during operation of the device, the threads advance into and through the gap in the brake blade without touching the tooth either above or below the gap, in precisely the same position within the gaps.

Referring now to the drawings, FIG. 1 shows a perspective view in partial cutaway of an exemplary elevator system, shown as an elevator shaft structure 10 according to the invention. In FIG. 1, structure 10 comprises in one representative form, two vertical columns 11a and 11b in a spaced arrangement, each column 11 supporting a corner of elevator platform 23 and extending from a foundation or base 12 upwardly a distance corresponding to the number of floors to be traversed by platform 23 supported on columns 11. It is noted that the two column structures of FIG. 1 can be expanded to four columns in a rectangular shaped elevator shaft structure, each column having supports for supporting platform 23 at the respective four corners thereof. In FIG. 1, it is seen that each column 11 comprises a vertically disposed structural member 13 comprising structural steel or other suitable structural material. An apparatus drive mechanism interconnects the structural members 13 of shaft structure 10 and platform 23 in order to move platform 23 vertically on shaft structure 10. As would occur to the skilled artisan practicing the invention and guided by these teachings, the invention may be applicable to substantially any conventional elevator drive mechanism known in the art, such as motor driven geared or gearless traction elevators, hydraulic piston driven elevators, pneumatic driven elevators, or climbing elevators. In one exemplary embodiment of the invention as illustrated in the drawings, attached to and extending substantially the full height of each member 13 are the elongate stators 15a and 15b of platform movement elements, shown as linear synchronous motors (LSM) 18a and 18b and brake rails 21a and 21b, and platform support rails 8a and 8b.

A vertically movable, horizontally oriented, elevator platform 23 is supported moveably on each of the columns 11a and 11b by an assembly of guidance (or support) wheels 6 (FIGS. 1 and 3) limiting lateral movement of the platform 23 (the vehicle) relative to the support rails, and supporting the platform against or upon the support rails, during travel along the platform support rails 8a and 8b. The elevator platform 23 is powered along the support rails 8 by the respective LSM vehicle elements 25a and 25b attached by an operative linkage 7 to the corners of platform 23 as illustrated in FIG. 2 and disposed in operative engagement with respective stator elements 15a and 15b. Each stator element 15 comprises a plurality of stator element segments 16, each having an associated position sensor 17 disposed adjacent thereto for sensing the position and velocity of vehicle elements 25 of the LSMs 18 along the lengths of stators 15. In alternate embodiments, any of two or more of the four columns 11 can include LSMs 18, brake rails 21 and vehicle elements 25 on the respective corners of platform 23. In each embodiment, all the LSMs 18 operate synchronously to move elevator platform 23 vertically upwardly or downwardly. FIG. 3 is a typical plan view representation at each column connection.

Each brake rail 21 attached to respective columns 11 comprises a structural material such as steel, aluminum, an alloy or other suitable structural material, and may comprise a plurality of rail segments 22 aligned and arranged end to end and extending substantially the full length of columns 11. Each brake rail 21 has defined on one edge thereof that faces platform 23 a multiplicity of spaced-apart, typically regularly-spaced, teeth 27 that cooperate with a shadow servo brake device 30 of the invention to provide a brake system for platform 23. Brake device 30 is attached securely to the corners of platform 23 as suggested in FIG. 3 and as described in various exemplary embodiments in detail below in relation to FIG. 4 through FIG. 12.

Figure 7:
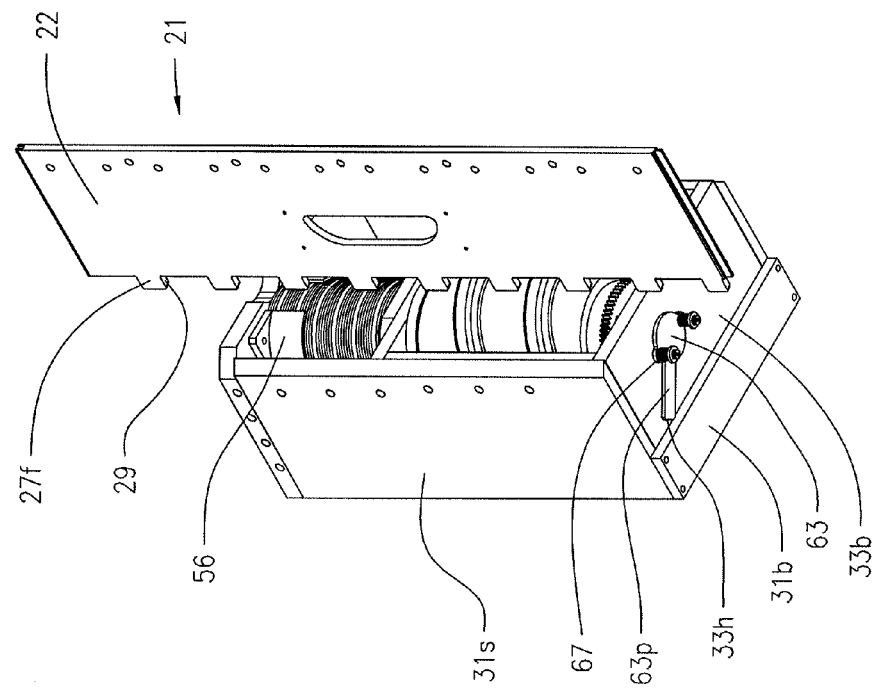
FIG. 7 is a perspective view showing the bottom and two sides of the brake apparatus.
Figure 6:
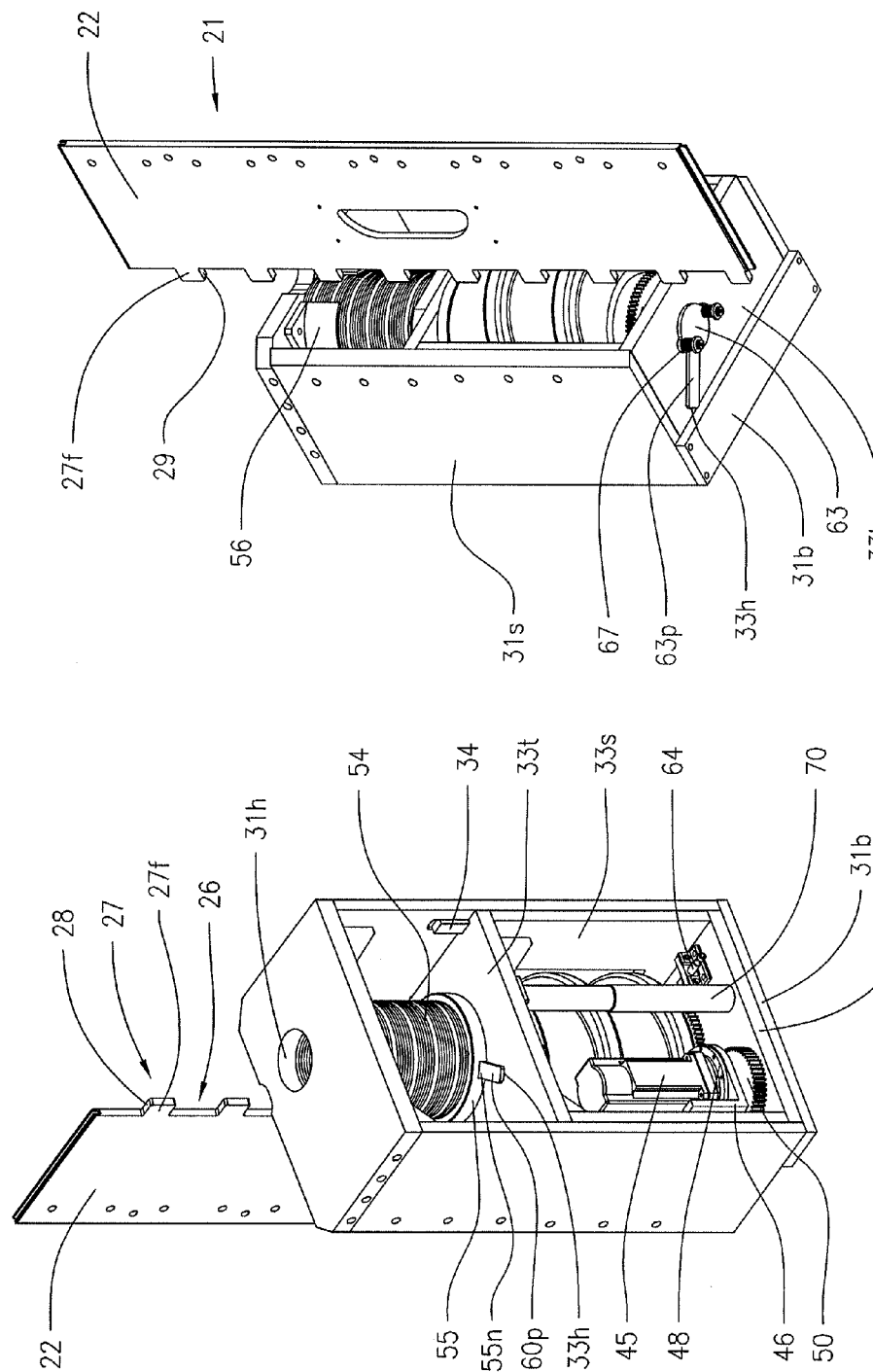
FIG. 6 is a perspective view showing the top and two sides of the brake apparatus.

In accordance with a feature of the invention, the brake rail 21 includes a multiplicity of regularly spaced teeth 27, with adjacent teeth 27 separated by gaps 26. The multiplicity of teeth 27 are of equal or equivalent size, vertical height ($y_t$) and configuration, and are positioned apart by a pitch distance B as shown in FIG. 4. The gaps 26 defined by the teeth 27 are typically equally spaced, and regularly-spaced apart at a constant pitch distance. Each tooth 27 is substantially rectangular in vertical cross section as viewed from the side as shown in FIG. 4, and each has a top landing surface 28 and a bottom landing surface 29 as seen in FIG. 6 and FIG. 7. The top landing surface 28 and the bottom landing surface 29 of each tooth 27 are typically substantially parallel, and are typically angled (not perpendicular) to the parallel side faces 27$f$ of the tooth, thereby having a parallelogram-shaped cross section when viewed from the front as shown in FIG. 8. Each of the multiplicity of gaps 26 are of equal or equivalent vertical height ($y_g$) and are spaced apart by the same pitch distance B as are the teeth 27. As seen in FIG. 9, the overall angle $\theta_{28}$ of the top landing surface 28, measured from a line perpendicular to the centerline axis 361 of the brake rotor 35, is typically substantially equal to the angle $\theta_{29}$ of the bottom landing 29, measured from a line perpendicular to the centerline axis 361 of the rotor 35. The angles $\theta_{28}$ and $\theta_{29}$ are typically configured to match the angle $\alpha_{40}$ of the helical thread 40, discussed herein below. The contour of the top landing surface 28 of each tooth 27 is typically configured to match the contour of the bottom surface of the helical thread 40 on rotor 35.

A helical thread 40 (hereinafter, thread 40) is disposed on or formed in the outer cylindrical surface 35$a$ of brake rotor 35, rendering the outer shape of brake rotor 35 to resemble a worm gear. The pitch of thread 40 is constant and is of a distance A, as shown in FIG. 9, and is equal or equivalent to the pitch (distance) B of gaps 26 and teeth 27 of brake rail 21 as seen in FIG. 8. Thread 40 has a substantially rectangular cross section as shown in FIG. 10. A single rotation of rotor 35 about its vertical centerline axis 361 causes the helical thread 40, relative to the elongated brake rail 21, to travel or advance vertically (upward or downward, depending on the rotation direction about centerline axis 361) a distance of one pitch length, distance A. Brake rotor 35 typically has a single thread 40 that can make one, two or more passes around the circumference of the brake rotor. The rotor can include two or more separate threads having the same pitch, and separated by a pitch corresponding to the pitch of gaps 26, can also be used. Thread 40 is preferably sized and disposed at a constant tooth angle $\alpha_{40}$ whereby there are at least two full turns on surface 35$a$ that engage gaps 26 between three successive teeth 27 as seen in FIG. 9, wherein as rotor 35 turns and the platform 23 is moved vertically synchronously, thread 40 moves into and through successive gaps 26 between and in spaced relationship to successive teeth 27 on brake rail 21, without touching or contacting the teeth.

The brake device 30 is also referred to as a shadow servo brake. The term "servo" is derived from the rotational operation of the rotor of the brake device by a servo motor, as will be discussed in more detail hereinafter. The term "servo motor" is intended herein to mean a controllably angular positionable motor wherein the shaft of the motor is positionable and rotatable through the sending of coded signals to the motor. The term "shadow" is derived from the requirement that the rotating brake rotor 35 of the brake device 30, attached to the elevator platform 23, rotates at, or accelerates to, a rotational speed that moves its advancing thread 40 vertically, either upwardly or downwardly, at the exact same velocity, or rate of acceleration, that the vehicle elements 25 of the LSMs 18 are moving the elevator platform 23.

It will be well understood by a person of ordinary skill in the art, in an aspect of the invention, that when the LSMs 18 are moving the elevator platform 23 at a constant vertical velocity of one pitch distance A per second, for example, thread 40 of the shadow servo brake rotor 35 would need to be driven by the servo motor 45 at a rotational speed of one revolution per second. The rotational direction and rotational speed of the brake rotor 35 needs to be controlled such that the entire thread length disposed on the outside cylindrical surface 35$a$ of brake rotor 35 passes through each gap 26 in succession on the brake rail 22, in order to remain loosely engaged within the successive gaps 26 along the length of the brake plate 21 as the elevator platform 23 travels vertically, wherein thread 40 typically engages the successive gaps 26 without contacting the top landing surface 28 of a tooth 27 below thread 40, or the bottom landing surface 29 of a tooth 27 above thread 40, but may contact the tooth 27 above or below with any force less than a force sufficient to cause vertical displacement of the brake rotor 35 within the brake device 30, for reasons discussed herein below. Typically, the advancing or retreating thread 40 moves without contacting teeth 27 as the platform 23 and the brake assembly 30 attached thereto move vertically upward or downward. More typically, the thread 40 is centered within the successive gaps 26 in the brake rail 21.

The length of each gap 26 between adjacent teeth 27 is selected so as to provide and define a spacing above and a spacing below thread 40 in the engaged gaps 26. In a typical embodiment, the spacing above thread 40 is selected as about one-half inch to about one inch, and the spacing below thread 40 is selected as about one-half inch to about one inch. Depending on the direction in which the elevator platform 23 is being driven, one may choose to increase the spacing above or below thread 40, and decrease the other. A larger, or smaller, spacing distance may also be used based on the accuracy and responsiveness of the servo control system. As discussed more fully below, when platform 23 is moving normally, thread 40 is typically substantially centered between the adjacent teeth 27 as illustrated in FIG. 9. Tooth angle $\alpha$ is selected typically less than the angle of repose for the mating surfaces (viz., thread 40 and teeth 27) which is twenty (20) degrees or less for typical materials.

The brake rotor 35 and thread 40 diameters and the pitch distance A of thread 40 are typically selected so that when brake rotor 35 is rotationally stable or stationary with the elevator platform 23 resting through the plurality of threads 40 upon the top landing surfaces 28 of the plurality of teeth 27 of the brake rails 21, the brake rotor 35 will not be back driven by any load placed by thread 40 on teeth 27 by the weight of elevator platform 23.

For applications that require higher vehicle movement speed, or that require a more compact package, a steeper helical pitch can be used. A tooth angle α of greater angle, for example up to 45 degrees, results in a greater rate of vertical travel at a given rotation rate of the brake rotor 35. For a tooth angle α that may be greater than the angle of repose for the mating surfaces, a friction brake can be included to engage frictionally the brake rotor 35 to impede rotation and prevent back driving of brake rotor 35 when in contact with spacer ring 62, such as the friction facing 68, described hereinafter and shown in FIGS. 10 and 11. In this situation, the friction facing 68 can serve as the main brake for impeding or preventing back driving of brake rotor 35 when in contact with spacer ring 62.

In the figures, it is seen that each brake apparatus 30 attached to elevator platform 23 includes a rigid mounting frame 31 providing a mounting structure for the movable components of brake apparatus 30. Mounting frame 31 is attached rigidly to elevator platform 23 (see FIG. 3) as through any suitable rigid attachment structure 32 such as bolts, welding or other mechanical attachments. Mounting frame 31 typically comprises steel, aluminum, an alloy or other structural material, and is a rigid structure which includes top and bottom end plates 31t and 31b and two side plates 31s. A rigid structure rotor frame 33, typically comprising a structural metal similar to mounting frame 31, and including top and bottom end plates 33t and 33b and two side plates 33s, is slidable within mounting frame 31. A pair of rectangular shaped keys 34 may be included between the full height of the rotor frame side plates 33s and mounting frame side plates 31s to guide the vertical movement of rotor frame 33 within the mounting frame 31, for reasons discussed herein below.

The rotor frame 33 houses and supports the brake rotor assembly 39, the servo motor 45 drive and the up proximity switch 61 and down proximity switch 64. The brake rotor assembly 39 supports the brake rotor 35 for rotation by means of a pair of bearings 37t and 37b on and about the non-rotating shaft 36, rotor gear 42 and rotor gear adapter 43. Brake rotor 35 is also comprised of suitable metallic or other structural material. The non-rotating shaft 36 is supported top and bottom respectively with sleeve bushings 38t and 38b mounted in the top end plate 33t and bottom end plate 33b of rotor frame 33 forming a vertical centerline axis 361 of the brake rotor 35. The sleeve bushings 38 allow the non-rotating shaft 36 to move along the vertical centerline axis 361. The bottom of the shaft 36b is supported by the lower proximity plate 63 flush with the bottom of the rotor frame bottom end plate 33b. The round shape of the shaft 36 has the same length as the height of the rotor frame 33 and extends to the bottom side of the upper proximity plate 60 flush with the top of the rotor frame top end plate 33t. The top of the shaft 36t has a square feature 36s with a diagonal slightly smaller than the diameter of the shaft 36 which protrudes into a square hole 60h in upper proximity plate 60. The shaft square feature 36s prevents shaft 36 from rotating.

In FIG. 9 it is seen that servo motor 45 and servo driven planetary gearbox 48 are rigidly mounted to an inner surface of one rotor frame side plate 33s such as by bracket 46 and is disposed so that the centerline 451 of the servo driven planetary gearbox 48 is parallel to the vertical centerline axis 361 of rotation of the brake rotor 35. In operation as described more fully below, the rotational position, speed, and acceleration of the servo motor 45 is operatively connected to and controlled by a programmable logic controller (PLC), by receipt of signaling sent to the servo motor by the control system, the function and operation of which is described below in relation to FIG. 13 through FIG. 16, that also controls the position and speed of the elevator platform 23 along the vertical extent of the elevator system 10 structure, by signaling the apparatus drive mechanism. The servo driven planetary gearbox 48 drives mounted servo motor gear 50 (see FIG. 6) and brake rotor 35 through rotor gear 42 and rotor gear adapter 43. Rotor gear adapter 43 may be attached directly to the bottom of brake rotor 35 with rotor gear 42 mounted directly to rotor gear adapter 43. In one aspect of the invention, as shown in FIG. 9, an optional idler gear 51 is interposed between servo motor gear 50 and rotor gear 42. Inclusion of idler gear 51 allows servo motor gear 50 to be small in diameter so as not to extend into the space beneath brake rotor 35, which also allows substantial flexibility in the positioning of servo motor 45 within frame 33. Servo motor 45 is equipped with a servo holding brake 116 to prevent back driving of brake rotor 35 and servo driven planetary gearbox 48 or as a redundant constraint against back driving brake rotor 35. It is further noted that in another embodiment of the invention servo motor gear 50 and rotor gear 42 could be replaced by a belt drive (not shown).

The upper proximity plate 60 (see FIG. 11) is held flush with the top of the rotor frame top end plate 33t by an upper shaft compression spring 66 located in a cavity 57c on the bottom of the spring guide pin 57. The force of the upper shaft compression spring 66 against the upper proximity plate 60 is slightly greater than the combined forces of any significant upward force from inertia of the brake rotor assembly 39 from downward movement of the elevator platform 23, and any significant upward force on rotor gear 42 by the servo motor 45 drive. The up proximity switch 61 is mounted on the bottom surface of the rotor frame top end plate 33t outside the diameter of the brake rotor 35. The up proximity switch 61 is normally closed (blocked). A significant force applied to the brake rotor assembly 39 in a downward direction would move the upper proximity plate 60 upward. A proximity pin 65 attached to the upper proximity plate protrusion arm 60p and passing thru a hole 33h (FIG. 6) in the rotor frame top end plate 33t moves upward unblocking and tripping the up proximity switch 60 signaling a fault to the servo amplifier 114 (see discussion below with respect to FIG. 13 through FIG. 16). The upper proximity plate protrusion arm 60p passes thru a notch 55n of similar size and shape in the base flange 55 of the spring guide pin 57 which keeps the upper proximity plate 60 from rotating.

The lower proximity plate 63 (see FIG. 12) is held flush with the bottom of the rotor frame bottom end plate 33b by a pair of lower shaft spring stacks 67 which may typically comprise Belleville springs. The force of the lower shaft spring stacks 67 against the lower proximity plate 63 is slightly greater than the combined forces of the weight of brake rotor assembly 39, any significant downward force from inertia of the brake rotor assembly 39 from upward movement of the elevator platform 23, and any significant downward force on rotor gear 42 by the servo motor 45 drive. The down proximity switch 64 is mounted on the top surface of the rotor frame bottom end plate 33b outside the diameter of the rotor gear 42 and the rotor gear adapter 43. The down proximity switch 64 is normally closed (blocked). A significant force applied to the brake rotor assembly 39 in a downward direction would move the lower proximity plate 63 downward. A proximity pin 65 attached on the lower proximity plate protrusion arm 63p and passing thru a hole 33h in the rotor frame bottom end plate 33b moves downward unblocking and tripping the down proximity switch 64 signaling a fault to the servo amplifier 114.

The brake rotor assembly 39 (FIG. 8 and FIG. 9) is limited in travel upward along the vertical centerline axis 361 by the distance between the top of rotor 35 and the bottom of a spacer ring 62 disposed on the bottom of the rotor frame top end plate 33t (see FIG. 9). This upward travel distance is sufficient to move the upper proximity plate 60 and the attached proximity pin 65 to unblock and trip the up proximity switch 61 (FIG. 11). A friction facing 68 may be applied to the bottom surface of spacer ring 62 to impede rotation and prevent back driving of brake rotor 35 when in contact with spacer ring 62. The frictional forces of friction facing 68 can be increased to accommodate a tooth angle α of greater than the angle of repose of the mating surfaces, to impede rotation and prevent back driving of brake rotor 35 when in contact with spacer ring 62.

The brake rotor assembly 39 is limited in travel downward along the vertical centerline axis 361 by the distance between the rotor gear 42 or the rotor gear adapter 43 and a lower stop plate 69 disposed on the top of the rotor frame bottom end plate 33b. This downward travel distance is sufficient to move the lower proximity plate 63 and the attached proximity pin 65 to unblock and trip the down proximity switch 64.

The up proximity switch 61 serves as a sensor that is "tripped open" or actuated when thread 40 on rotor 35 applies downward force against the top landing surface 28 of a tooth 27 of a brake rail segment 22 affecting rotor 35 to travel significantly upwards along rotor centerline 361. The resulting fault response sends an actuation signal to the servo amplifier 114 (see FIGS. 13-16) of the system to stop, or rapidly bring to a stop, rotation of rotor 35. The down proximity switch 64 serves as a sensor that is "tripped open" or actuated when thread 40 on rotor 35 applies upward force against the bottom landing surface 29 of a tooth 27 of a brake rail 22 effecting rotor 35 to travel significantly downwards along brake rotor centerline axis 361, resulting in a fault response which sends an actuation signal to the servo amplifier 114 of the system to stop, or rapidly bring to a stop, rotation of brake rotor 35. Other sensor arrangements not specifically described herein may be used as would occur to the skilled artisan practicing the invention to stop, or rapidly bring to a stop, rotation of rotor 35 during a fault condition that would prevent controlled movement of elevator platform 23.

Upward and downward movement of the elevator platform 23 is powered by the LSM vehicle elements 25 and governed by the control system which sends control signals to the LSM. Should a loss of power or a fault cause the LSM vehicle elements 25 to lose thrust, the elevator platform would fall with the force of gravity. This significant downward force of thread 40 on the top landing surface 28 of a tooth 27 of the brake rail 22 would displace the rotor 35 upward into contact with the spacer ring 62 disposed on the bottom of the rotor frame top end plate 33t. To cushion this significant force impact, such as an emergency stop, the rotor frame 33 has spring guide pin 57 to guide vertical movement within mounting frame 31 and the movement is opposed by a rotor frame spring pack 54. Spring guide pin 57 is disposed (as by bolting) to the top of rotor frame top end plate 33t on the brake rotor centerline axis 361. A spring pack 54 is disposed between the top of a base flange 55 of the spring guide pin 57 and the bottom of mounting frame top end plate 31t. In one aspect of the invention, spring pack 54 includes one or more stacked Belleville disk springs 59 stacked both parallel (to increase load) and inverted (to increase deflection). Outer spring guide 56 and spring guide pin 57 center and guide the compressive movement of spring pack 54. Spring pack 54 is typically preloaded to support a weight greater than the weight typically of the elevator platform 23 and any additional freight or payload weight carried thereon, so that during normal "Lift Off" mode, normal payload loading of the elevator platform 23 and the brake apparatus 30, does not result in movement of rotor frame 33 upwardly within mounting frame 31. Spring pack 54 otherwise opposes but allows a small upward movement of rotor frame 33 within mounting frame 31 at elevator platform loads above that which is normally expected. Should brake apparatus 30 be subject to an emergency stop that causes spring pack 54 to be compressed, an optional hydraulic damper assembly 70 (FIG. 6), disposed at the top against the bottom of rotor frame top end plate 33t and at the bottom against the top of mounting frame bottom end plate 31b, will cushion the subsequent rebound of spring pack 54 and will cushion the rebound impact of rotor frame bottom end plate 33b against the bottom end plate 31b of mounting frame 31. Hydraulic damper assembly 70 may comprise a commercially available damper selected by the skilled artisan practicing the invention (for example, Taylor Fluidshok Model 1-1/2x3W). A hole in the mounting frame top end plate 31t on the centerline axis 361 and a tapped hole in the top of the spring guide pin 57 on the centerline axis 361 allows the temporary use of a pulling bolt (not shown) to preload spring pack 54 for assembly.

It would be understood that an emergency stop or force impact may also occur in the opposite or upward direction, where a significant upward force of thread 40 on the bottom landing surface 29 of a tooth 27 of the brake rail 22 would displace the rotor 35 downward, and that in an alternative embodiment, a spring pack 54 can also be disposed between the bottom surface of the rotor frame bottom end plate 33b and the top of mounting frame bottom end plate 31b.

Figure 18:
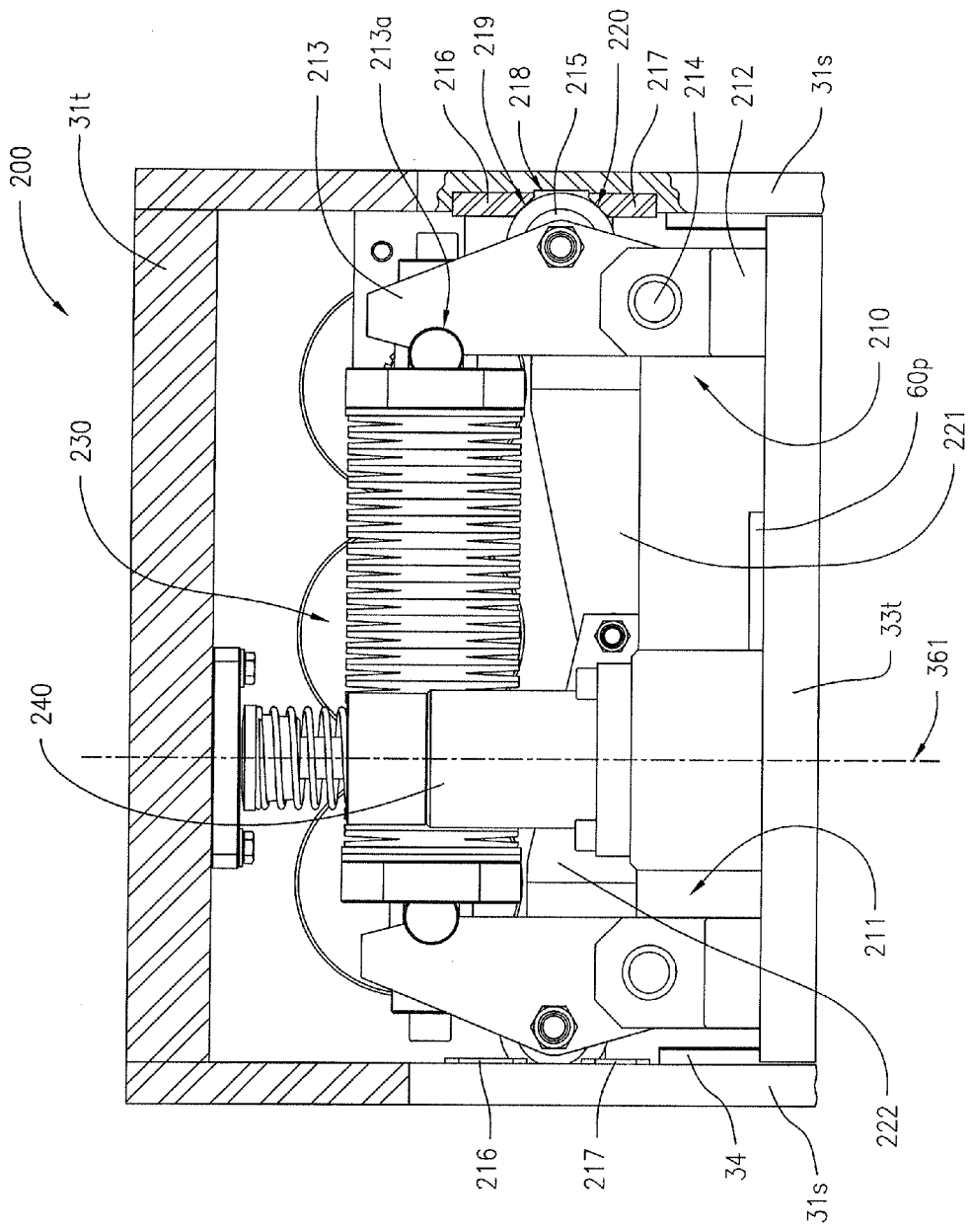
FIG. 18 shows a front elevation view of the cushioning device of FIG. 17 as viewed through line 18-18.

FIGS. 8 and 17-19 show an alternate device and method to cushion the significant force impact, in either direction, as in an emergency stop, where the rotor frame 33 has guided vertical movement within mounting frame 31, and the movement is opposed by a cushioning device shown as a detent roller spring mechanism 200, including two opposing detent roller assemblies 210 and 211 and a connecting overload spring assembly 230. As shown in FIG. 18, each detent roller assembly 210, 211 includes a mounting base 212, a lever 213, a lever pivot 214 and a roller 215 with the mounting base 212 disposed (as by bolting) to the top of the rotor frame top end plate 33t. Recessed on the inside of both mounting frame side plates 31s are an upper detent plate 216 and a lower detent plate 217, each with a chamfered face 219, 220 that are spaced a set distance apart to form a detent pocket 218 for the roller 215. The connecting overload spring assembly 230 forces the levers 213 with the roller 215 into the two formed detent pockets 218, which locates the rotor frame 33 within the mounting frame 31 during normal operation of the brake apparatus. The connectors 221 and 222 are attached at a first end to one another, typically by a removable securement such as a bolt, and secured at opposed second ends to the levers 213 to form a linkage that requires the levers 213 to both rotate towards or away from each other uniformly.

In normal operation the overload spring assembly 230 is typically preloaded (the springs are in a pre-compressed state to exert lateral force) to allow the rollers 215 to remain seated in the detent pockets 218, and with a force sufficient to support a weight greater than the weight typically of the elevator platform 23 and any additional freight or payload weight carried thereon. Thus, during normal "Lift Off" mode, normal payload loading of the elevator platform 23 and the brake apparatus 30, does not move rotor frame 33 upwardly within mounting frame 31. Should a loss of power or a fault in the thrust of the LSM vehicle elements 25 cause the elevator platform and the connected mounting frame 31 to lose rotative speed with the brake rotor assembly 39 in either the upward or downward direction, the brake rotor assembly 39 will crash into the stationary teeth 27 of the brake blade 21. Should the upward or downward force of a crash of the brake rotor assembly 39 cause the chamfered faces 219, 220 to exert a lateral force inwardly upon the overload spring assembly 230 of greater than the preloaded force, the rollers 215 will cam up the chamfered faces 219 (or 220) of the upper detent plates 216 (or the lower detent plates 217), and out of the detent pockets 218, causing the overload spring detection switch 225 (FIG. 17) to be tripped. When the rollers 215 are completely out of the detent pockets 218, the rotor frame 33 can move freely within the mounting frame 31. The free movement upward and above the detent pockets 218, is further cushioned by the shock absorber 240, and is limited in travel when the top of the detent roller mounting base 212t meets the bottom surface 250b of the mounting frame 33 large cross stiffener plate 250, shown in FIG. 17. The free movement downward and below the detent pocket 218 is limited to the distance of travel gap 260 when the bottom surface of the rotor frame bottom end plate 33b meets the top surface of the mounting frame bottom end plate 31b.

When the detent roller spring mechanism 200 is displaced from the detent pockets 218, the rotor frame 33 with the disposed detent roller spring mechanism 200 can be moved back into position with the rollers 215 in the detent pockets 218 by different manual or controlled powered methods. A controlled power method for resetting the detent roller spring mechanism 200 back into normal operation position can include operating the elevator motors to slowly move the elevator the mounting frame 31 along the brake rail 21, with the brake rotor 35 in contact with the brake rail, thereby urging the rotor frame 33 and detent roller spring mechanism 200 into registry with the detent pockets 218. A manual method for resetting the detent roller spring mechanism 200 back into normal operation position can include use of a lever or a pry bar to move the mounting frame 31 relative to the rotor frame 33, or to use a jacking bolt threaded through a tapped hole in the top (or bottom) of the mounting frame 31 to drive the rotor frame 33 into registry with the detent pockets 218.

It would be understood that the detent roller spring mechanism 200 can also be disposed between the bottom surface of the rotor frame bottom end plate 33b and the top of mounting frame bottom end plate 31b.

The overload spring assembly 230 uses a series of disk springs 236 to provide the spring force to keep the rollers 215 seated in the detent pockets 218. The disk springs 236 are guided on a rod 234 and push against spring guide plates 233 which are in contact with the rod guide blocks 231 on both ends. The rod guide block curved surface 231a fit in the lever arc cutout 213a (see FIG. 18) of each lever 213, delivering the force to the rollers 215. In FIG. 19a, the installation configuration of the overload spring assembly 230, the assembly is compressed to a length that will allow for installation of the rod guide block curved surface 231a into the lever arc cutout 213a. This compression is created by the guide rod caps 232 facing inward, allowing the rod 234 to move in the inside diameter and be secured by the screw 235 while pushing the rod guide blocks 231 towards each other. In FIG. 19b, the normal operation configuration of the overload spring assembly 230, the screws 235 are removed, the guide rod cap 232 reversed and the screw 235 re secured. With the guide rod cap 232 facing outward, the rod guide blocks 231 can extend to the same length as the rod 234 and apply the force to the rollers 215.

Referring now to FIG. 13 through FIG. 16, shown therein are block diagrams of an exemplary controller system for controlling the movement of the components of the elevator system 10, including Linear Synchronous Motors (LSMs) 18 and the brake device 30 in various aspects of command, feedback, position sensing, speed sensing, speed control, and fault response scenarios according to the invention. Consistent with the illustrated elevator system 10 of FIG. 1, FIG. 13 through 16 each show a common master programmable logic controller (PLC) 101, a common platform controller (PC) 103, two shadow servo brake device 30 (shadow servo "A", and shadow servo "B") with associated sensors 17 and LSMs 18. The common PLC 101, PC 103, and the components of only one column system (shadow servo "B" and Motor Electronics Enclosure (MEE) "B") are shown in detail, it being understood that corresponding components also comprise shadow servo "A" and MEE "A". Further, as suggested above, the elevator system 10 can comprise four columns in an alternative embodiment for the elevator shaft arrangement, with up to four shadow servo brake device 30 and an MEE 106 with associated sensors 17 and LSMs 18 included at respective corners of elevator platform 23.

In FIG. 13 through FIG. 16, it is seen that the control system for the elevator system of the invention comprises a master Programmable Logic Controller (PLC) 101 that supervises the operation of the elevator system 10. In one exemplary embodiment of the invention, the PLC 101 includes a Rockwell Automation GuardLogix #1756-L61S processor with a #1756-LSP safety partner mounted in a Rockwell ControlLogix PLC rack with modules including a ProSoft Technologies DF1 communications module (#MVI56-DFCM), Rockwell Automation DeviceNet scanner (#1756-DNB), EtherNet communications (#1756-ENBT), digital input (#1756-IB16) and digital output (#1756-OB16E/A). The PLC is programmed with a ladder logic application development using Rockwell Automation's RSLogix 5000 software package. Other synchronizing controller means alternative to the PLC systems for controlling the operation of the elevator system, including commercially available components, programmable computers, hardware and software may be selected by one skilled in the applicable art, within the scope of these teachings and the appended claims, the exemplary PLC embodiment described herein not being exhaustive of the PLC systems contemplated within the scope of the invention. As used herein, the terms "Programmable Logic Controller" or "PLC" are intended to include such alternative systems. Vertical movement of the elevator platform 23 for each braking system 30 is performed by an LSM 18 including a single Platform Controller (PC) 103, which is a purpose built computer (MagneMotion, Inc. (MMI)), connected to one Motor Electronics Enclosure (MEE) 106, which houses the controls for each vertical thrust vehicle element 25. Included in the MME controls are input fusing for 440 VAC/3 phase/60 Hz, input filtering, an AC to DC rectifier, a purpose built computer (Motor Controller), four commercially available variable frequency drives and an electromagnetic interference reducing output filter system. Alternative arrangements for the Platform Controller and the Motor Electronics Controller could also be selected by one skilled in the applicable art guided by these teachings in order to accomplish the intended function, the specific embodiments described herein being only representative of all such alternative arrangements with the scope of the appended claims. Each vehicle 25 houses powerful permanent magnets that act as a linear rotor of the LSMs 18. Each stator segment 16 comprises a number of sections of winding elements that connect to the MEE 106 via a stator switch unit 108. Also connected to the stator switch unit 108 is a position sensor arrangement that determines displacement of vehicle 25 using a number of Hall effect sensors 17 reading a permanent magnet array that is mounted on vehicle element 25. In one exemplary embodiment of the invention, the multiple stator switches 108 illustrated in FIG. 13 through FIG. 16 as connected to a single LSM 18 are wired to one of the variable frequency drives within the MEE 106 in groups of every fourth stator switch 108 using the same variable frequency drive. This arrangement may be implemented in order to allow the MEE 106 to control motion of the vehicle 25 in the LSM 18 by providing current to three separate stator segments 16 and switching on the fourth stator segment 16 ahead of the travel of vehicle 25.

The PLC 101 communicates with the PC 103 via an ANSI EIA/TIA-422 serial link using Rockwell Automation's DF1 protocol as defined in Allen Bradley publication 1770-6.5.16 (October 1996) DF1 Protocol. The DF1 link passes a number of 16 bit registers between the computer based memories of the PLC 101 and the PC 103. Contents and function of the DF1 registers are defined with an Interface Control Document (IDC), MMI #990000049, incorporated herein by reference. All commands from the PLC 101 contain common data (defining velocity, position, acceleration, etc) for each vehicle element 25, with the exception that a small position offset for each individual vehicle element 25 can be specifically commanded as discussed more fully below. The PC 103 takes the PLC 101 commands and breaks them into control data for each MEE 106. A serial communications link 111 is made to control and monitor each MEE 106 from the PC 103. In one control embodiment data is typically passed between the PC 103 and each MEE 106 every 2 ms. The MEEs 106 take commands to liftoff, move, halt or release from the PC 103 and turn them into control of current to the stator sections 16. The PC 103 monitors the LSM 25 vehicle element system by looking at data from the MEEs 106 including vehicle element position, stator currents, thrust, error flags and MEE 106 status as defined in the MMI ICD.

The controls for each shadow servo brake device 30 are an independent system from the LSM 25 controls. In exemplary embodiments of the invention, the control system for each brake device 30 includes an Applied Motion Product model BluDC9-S servo amplifier 114 that controls a servo motor 45 with rotary resolver (or encoder) feedback 115 and an electrically released shaft servo holding brake 116. The servo amplifier 114 operates in a closed loop position control mode using the feedback 115 signal to maintain the commanded servo motor 45 position. Other servo drives and motor drive components may be used for the intended function of controlling the servo brake device 30 as would occur to the skilled artisan guided by these teachings. Servo drives and motor components and systems commercially available could be assembled and substituted within the intended scope of the invention and the appended claims, the specific exemplary embodiments herein described being only representative of such commercially available servo and motor drive arrangements usable in the invention.

In operation, the servo amplifier 114 receives positioning command data that includes the target position of the servo motor 45, the acceleration rate for movement, the deceleration rate for the movement and the target motor velocity. This data is activated by a discrete command to start the move. Physically, the servo amplifier 114 command interface could consist of a high speed serial communications link (IEEE RS-232 or RS-422 or RS-485) or a field bus connection (Ethernet/IP, Profibus DP, CAN Open). Additionally, a hard wired discrete connection carries as an input to enable the servo amplifier 114 and as an output a ready signal that indicates servo amplifier 114 is enabled, no faults are detected and it is ready to receive a movement command. Faults can include an error in the feedback signal, a motor current limit reached, either up proximity switch 61 or down proximity switch 64 input signal detecting a vertical load on the brake rotor thread 40, etc. If the enable signal is lost, servo amplifier 114 immediately halts any motion and then turns off current to the servo motor 45.

The electrically released servo holding brake 116 is automatically controlled as a built in function of the servo amplifier 114 firmware. When the servo amplifier 114 is commutating current to the servo motor 45, the brake 116 is released, and when the current is off, the brake 116 is set or activated. In one version of the invention, servo motor 45 mechanically drives a planetary gearbox 48, such as including servo motor gears 50 and optional idler gear 51 (see FIG. 9) that in turn drives the rotor gear 42 connected to thread 40 that engages the gaps 26 in brake rail 21. As discussed more completely above in relations to FIG. 4 through FIG. 12 collectively, thread 40 has some vertical freedom of movement within gaps 26 with either end limit of the vertical movement actuating a proximity sensor (61 or 64). When there is no vertical load on either the top or bottom contact face of thread 40, the rotor brake 35 is centered in its travel by plates 60 and 63 and springs 66 and 67, and neither up proximity switches 61 or down proximity switch 64 is actuated. Both proximity switches 61,64 are wired as inputs to the servo amplifier 114.

There are several operation modes that could be implemented for the command signal to the shadow servo brake system comprising brake device 30. These include direct command from the master PLC 101 (see FIG. 13), commands derived from the data stream between the PC 103 and the MEE 106 (see FIG. 14), commands from the MEE 106 (see FIG. 15), and commands from independent linear position sensors 17 (see FIG. 16).

Figure 13:
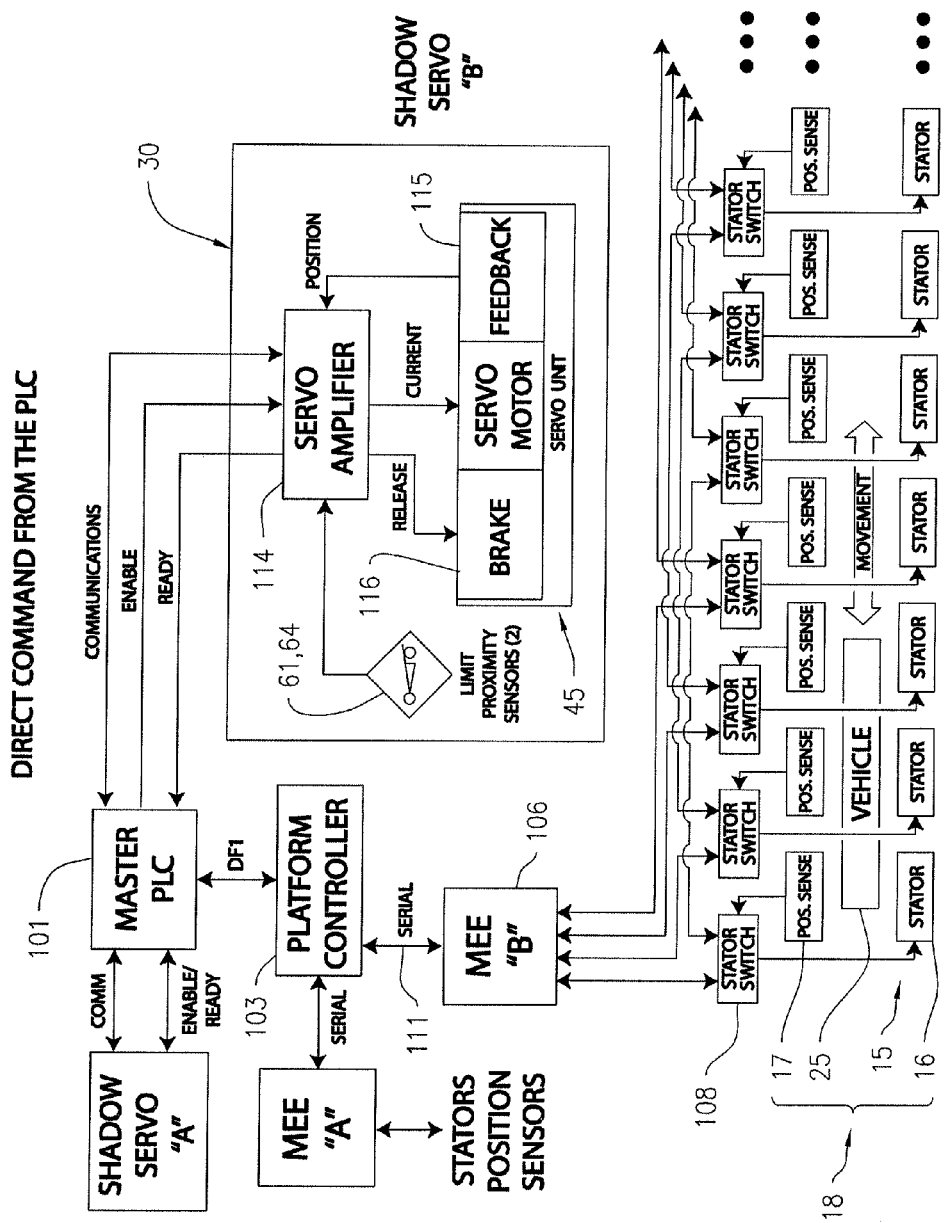
FIG. 13 through FIG. 16 are block diagrams of an exemplary system based on a programmable logic controller for controlling the movement of the components of the elevator system and the brake device in various aspects of command, feedback, position and speed sensing and control, and fault response scenarios according to the invention.

With reference specifically now to FIG. 13, the elevator operational mode comprising direct commands from the PLC 101 proceeds as follows. During normal operation of the elevator system, the PLC 101 controls both the speed and positioning of the LSMs 18 and the brake device 30 in three main command modes for the change of floor cycle, namely, a "lift-off" mode, a change of floor "move" mode, and a set-down or "halt" mode.

In the lift off mode, the master PLC 101 first receives an input from the operator to move the elevator platform 23. The lift off mode is a vertical move of elevator platform 23 at the start of a change of floor cycle. Before liftoff, the brake device 30 is rotationally stationary and is at rest upon teeth 27. If all system components are in an operating state (no stop signal active, PC 103 reports "Ready for Liftoff" state, no faults), then the PLC 101 sends a "Liftoff" command to the PC 103. The PC 103 translates the liftoff command data into movement commands to each MEE 106. The MEEs 106 will then gradually increase current to each respective LSM 18 until either the position sensors 17 detect the commanded liftoff distance or a maximum set current is reached without achieving the commanded movement. During the lift off (LO) mode, the platform 23 is moved vertically upwardly a distance of about the design spacing between the top surface of rotor 35 and the upper proximity switches 61 in the operational mode, plus a distance sufficient to center thread 40 within gap 26 between the corresponding adjacent teeth 27, in order to bring each brake device 30 out of contact with teeth 27 on the brake rail(s) 21. If, when the maximum current to the LSMs 18 is reached, the MEEs 106 report "Overweight Liftoff" to the PC 103 and to the PLC 101, the move is stopped, and a fault signal is generated for the operator to act on. If the liftoff move completes successfully, then a "Lifted Off" state is reported from PC 103 to PLC 101.

Operation of the shadow servo brake device 30 starts at a successful "lift-off" state. The discrete enable signals from PLC 101 to servo amplifier 114 are switched from a disabled state to an enabled state. The PLC 101 checks that all servo amplifiers 114 report that they are ready. At this point, the elevator platform 23 is being supported by thrust from each vehicle element 25 controlled by the individual MEEs 106. As indicated above, thread 40 of each brake rotor 35 is substantially centered in gap 26 of the corresponding brake rail 21. The master PLC 101 calculates the corresponding shadow servo brake 30 positions and transmits this movement data to each servo amplifier 114 and each servo brake 30 is commanded to perform the move. When all servo brakes 30 successfully complete the centering move, the PLC 101 calculates the move command for the elevator platform 23 including any offset data for each vehicle element 25 and including the equivalent rotary distance, acceleration, velocity and deceleration for each shadow servo brake 30 to match the linear data that was calculated for each vehicle element 25. Then a simultaneous command is sent to the PC 103 to "Move" and to each shadow servo amplifier 114. The elevator platform 23 moves with the shadow servo brakes 30 rotating to keep each thread 40 centered in the gaps 26 of the corresponding brake rail 21.

If the actual motion of a vehicle element 25 leads or lags the commanded motion profile a prescribed excessive amount, thread 40 will contact a tooth 27 of the corresponding brake rail 21 which will be detected by a sharp rise in current required to operate the servo motor 45, or one of the proximity sensors 61,64 will actuate. This will generate a fault in the PLC 101 and a "Halt" command will be issued to the PC 103 to stop platform 23 movement.

The change of floor mode commands the elevator platform 23 to move to a designated floor. From the commanded start to reaching the destination floor, each servo motor 45 is fed the commanded platform 23 position corresponding to the destination floor that the platform 23 is intended to follow. In this mode, each rotor 35 is commanded to rotate, at a speed that maintains each thread 40 within the gap 26, and typically centered, between teeth 27 of the brake rail 21, simultaneously with the commanded upward or downward movement of elevator platform 23. The PLC simultaneously accelerates platform 23 by controlling the LSMs 18 while simultaneously controlling the rotative movement of the rotors 35 by controlling the servo motors 45, until a selected normal platform 23 speed is reached.

If platform 23 movement stays close to the commanded motion profile, it will reach the commanded destination with each thread 40 of each brake device 30 centered the corresponding gap(s) 26. The PLC 101 then issues a "Halt" command to the PC 103. The PLC 101 calculates the desired final platform position from the current position of each vehicle element 25. By design, this will always be a small distance in the down direction. The PLC 101 will issue command data to each brake apparatus 30 to move to desired platform position causing each thread 40 to move from being centered in gaps 26 to the point where the gap between the upper surface of each thread 40 the worm and the bottom landing surface 29 of the corresponding teeth 27 is about 0.040 inch.

As long as the operation of platform 23 is normal, advancing thread 40 of the rotating brake rotor 35 remains centered between and out of contact with adjacent and successive teeth 27 along the length of the brake rail 21, such as shown in FIG. 9. If power to the system is lost, or if some other fault occurs, so as to cause any LSM 18 to lose thrust, platform 23 would start to fall (or if being raised, would decelerate and then start to fall). Simultaneously, brake rotor 35 will stop rotating, causing thread 40 to stop advancing vertically, and causing thread 40 of a brake rotor 35 to contact and impact downwardly onto a tooth 27 of brake rail 21. The opposing force would thrust brake rotor 35 upwardly into contact with rotor frame 33, which in turn would move upwardly in mounting frame 31. The movement of rotor frame 33 is opposed by spring pack 54, which cushions the impact of the fall of platform 23. Along with the upward movement of rotor frame 33, up proximity switch 61 trips off or deactivates the power to rotor 35.

As platform 23 approaches the designated floor, the PLC 101 simultaneously decelerates platform 23 by controlling the linear vertical speed and position of the LSMs 18, and the rotational speed of the brake rotors 35 until platform 23 comes to a stop at the designated floor, or more typically at a short distance above the designated floor where it hovers under the power of the LSMs 18.

The set down mode can include a vertical move of the platform 23 at the end of the change of floor mode. During this move, the servo motors 45 controlling the brake rotors 35 of each brake device 30 remain rotationally stationary and a predetermined rotary position. The PLC then commands the LSMs 18 to move platform 23 downwardly the distance required to bring platform 23 to rest even with the level of the designated floor, which approximates the distance to bring thread 40 into in contact with and supported on the top landing surface 28 of the teeth 27 on brake rails 21, and the weight of the elevator and its payload shifts the rotor frame 33 upwardly to bear upon spring pack 54 and actuate up proximity switch 61 and the servo brakes 30 are disabled, which causes the servo motor 45 current to shutoff and the shaft holding brakes to engage each servo motor 45. The set down mode can also include a rotational movement of the brake device 30 while the platform 23 remains stationary. The PLC commands the LSMs 18 to remain stationary, while commanding the brake device 30 to rotate the rotor 35 into contact and engagement with the top landing surface 28 of the lower tooth 27 on the brake rail 21. After engagement of the thread of the rotor 35 with the stationary tooth, the PLC command the LSM to power-down, allowing the weight of the elevator and its payload to shift the rotor frame 33 upwardly to bear upon spring pack 54 and actuate up proximity switch 61 and disable the servo brakes 30. This causes the servo motor 45 current to shutoff and the shaft holding brakes to engage each servo motor 45.

Once all the shadow servo amplifiers 114 turn off, their ready signals (brakes are "set"), the PLC 101 issues a "Release" command to the PC 103. This command causes each MEE 106 to ramp down the current to the LSMs 18 with thread 40 resting on the brake rail 21. On completion of the "Release", the PC will once again report the "Ready for Liftoff" state and the elevator platform 23 is again ready to move upon command from the operator.

Figure 14:
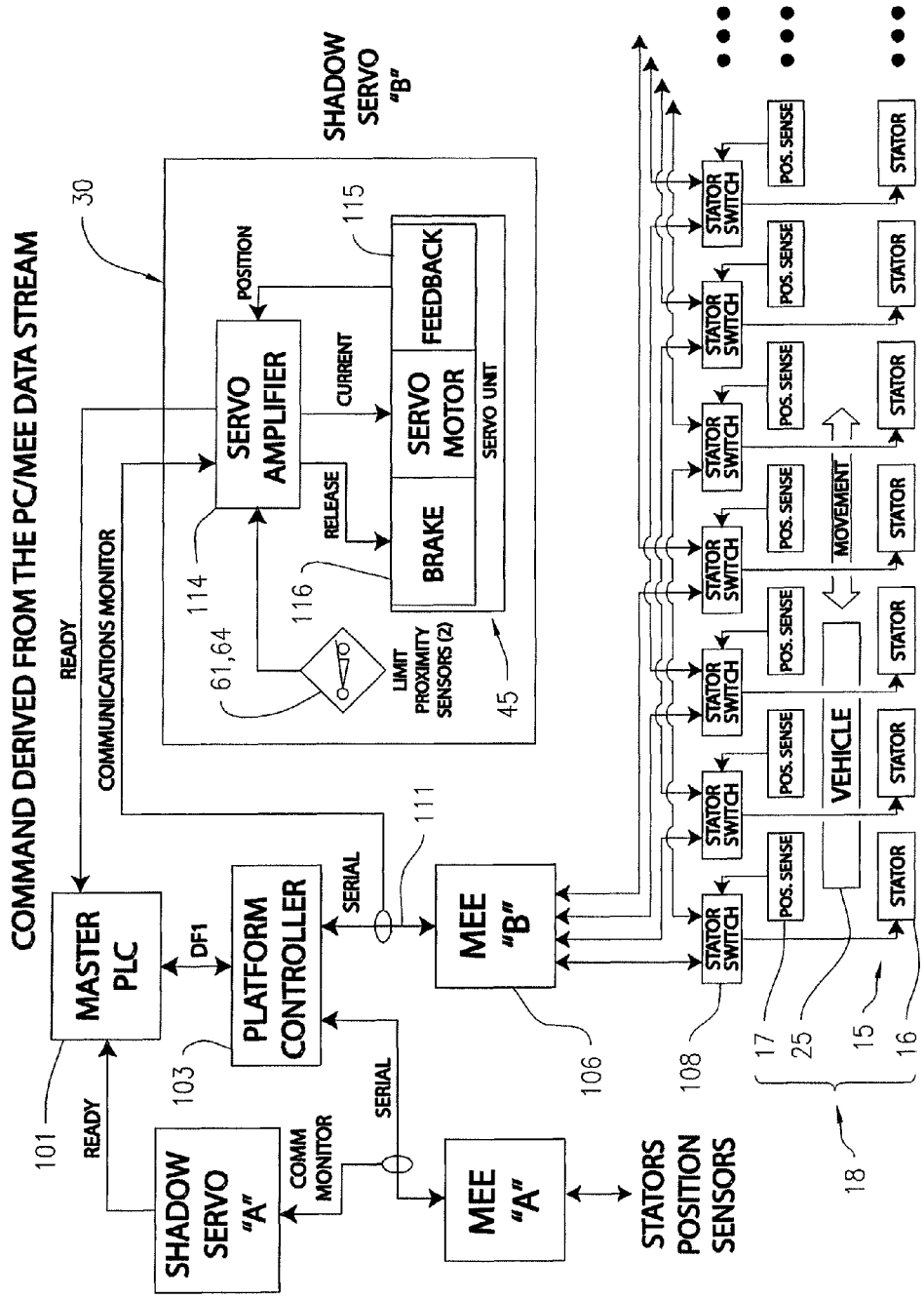

Referring now to FIG. 14, shown therein is the command scenario for the control system of the invention, wherein like named and numbered elements are the same in structure and function as illustrated in FIG. 13, in the case of commands from the data stream between the PC 103 and MEE 106. For the lift off mode, the operational command sequence for the FIG. 14 scenario is the same as that described above in relation to FIG. 13 from initial operator input to successful "Lifted Off" report from PC 103 to PLC 101.

At this point, operation of the shadow servo brake device begins by reading the data stream from the PC 103 to the MEEs 106. Upon detecting the "Lifted Off" result, the enable signals are switched from a disabled state to an enabled state. The PLC 101 checks that all servo amplifiers 114 report that they are ready for fault monitoring and shuts down the move if there is a fault. At this point, elevator platform 23 is supported by thrust from each vehicle element 25 controlled by the individual MEEs 106, and each thread 40 of the respective brake device 30 is centered in gap 26 of the corresponding brake rail 21. The servo amplifiers 114 calculate the difference between the commanded liftoff distance and the theoretical center point of the gap 26, and each brake device 30 then performs the move.

When each brake device 30 successfully completes the centering move, the system is ready for a PLC 101 generated "Move" command to the PC 103. The shadow servo braking system 30 continues to read the data stream from the PC 103 to MEE 106. As the MEE 106 moves the vehicle element 25, brake device 30 reads the data to generate a movement command to keep pace with the commanded move. The elevator platform 23 moves with the brake rotors 35 rotating to keep each thread 40 centered in the gaps 26 of the corresponding brake rail 21.

Similarly to the FIG. 13 command scenario, if the actual motion of a vehicle element 25 leads or lags the commanded motion profile a prescribed excessive amount, thread 40 will contact a tooth 27 of the corresponding brake rail 21 which will be detected by a sharp rise is current required to operate the servo motor 45, or one of the proximity sensors 61,64 will actuate. This will generate a fault in the PLC 101 and a "Halt" command will be issued to the PC 103 to stop platform 23 movement.

If the elevator platform 23 movement stays close to the commanded motion profile, platform 23 will reach the commanded destination with brake thread(s) 40 centered in the corresponding gap(s) 26. The PLC 101 then issues a "Halt" command to the PC 103. The shadow servo amplifier 114 calculates and executes a move causing threads 40 to move from being centered in gaps 26 to the point where the gap between the upper surface of each thread and the bottom surface 29 of the corresponding teeth 27 is about 0.040 inch.

Each brake device 30 is then disabled causing servo motor 45 current to shut off and the shaft holding brakes to engage each servo motor 45. Once all servo amplifiers 114 turn off their ready signals (brakes are "set"), the PLC 101 issues a "Release" command to the PC 103, which cause MEE 106 to ramp down stator 15 current to zero and each thread 40 will set down on the a tooth 27 of the corresponding brake rail 21. On completion of the "Release", the PC 101 will once again report the "Ready for Liftoff" state and the elevator platform 23 is ready move again when the operator commands it.

Figure 15:
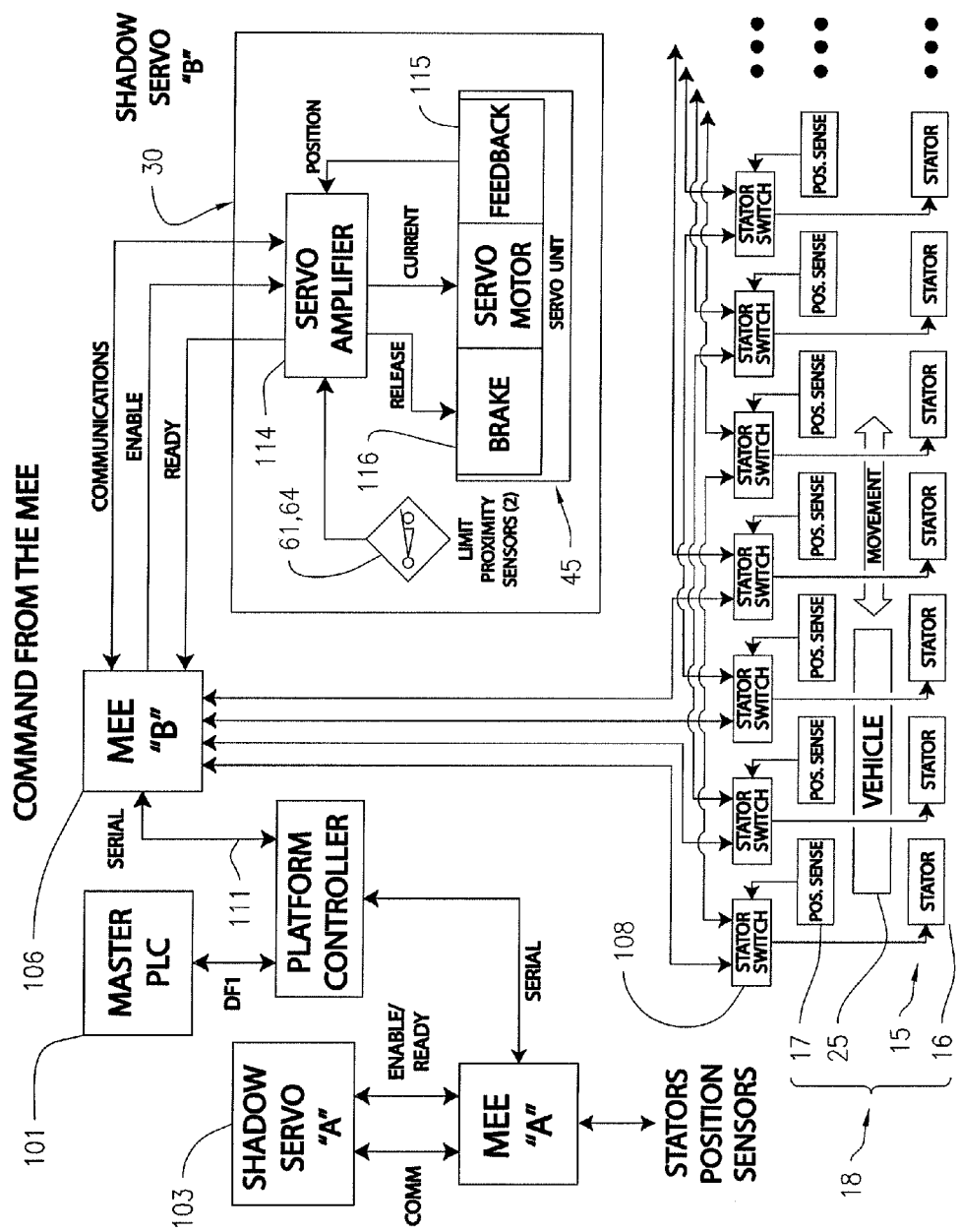

Referring now to FIG. 15, shown therein is the command scenario for the control system of the invention, wherein like named and numbered elements are the same in structure and function as illustrated in FIG. 13, in the case of commands from the MEE 106. For the lift off mode, the operational command sequence for the FIG. 15 scenario is the same as that described above in relation to FIG. 13 from initial operator input to successful "Lifted Off" report from PC 103 to PLC 101.

At this point, operation of the brake device 30 begins. Each MEE 106 switches the discrete enable signal from disabled to enabled, and checks that the shadow servo amplifier 114 reports that it is ready. Elevator platform 23 is now supported by thrust from each vehicle element 25 controlled by the individual MEEs 106, and each thread 40 of the respective brake device 30 is centered in gap 26 of the corresponding brake rail 21. Each MEE 106 calculates the thread 40 position needed to make the gap above and below the thread 40 equal and transmits this movement data to the servo amplifier 114, and each brake device 30 then performs the move.

When each braking system 30 successfully completes the centering move, the PLC 101 calculates the move command for elevator platform 23 including any offset data for each vehicle element 25. A command is sent from PLC 101 to PC 103 to "Move". Each MEE 106 receives the move command from the PC 103 and sends commands to move the brake device 30 at the same rate as vehicle 25. Elevator platform 23 moves with the brake rotors 35 rotating to keep each thread 40 centered in gaps 26 of corresponding brake rails 21.

Similarly to the FIG. 13 command scenario, if the actual motion of a vehicle element 25 leads or lags the commanded motion profile a prescribed excessive amount, thread 40 will contact a tooth 27 of the corresponding brake rail 21 which will be detected by a sharp rise is current required to operate the servo motor 45, or one of the proximity sensors 61,64 will actuate. This will generate a fault in the MEE 106. The brake device 30 will be stopped immediately. The fault data will be transmitted from the MEE 106 to the PC 103 and then to the PLC 101. The PLC 101 will act on the fault and a "Halt" command will be issued to the PC 103 to stop platform 23 movement.

If the elevator platform 23 movement stays close to the commanded motion profile, platform 23 will reach the commanded destination with brake thread(s) 40 centered in the corresponding gap(s) 26. The PLC 101 then issues a "Halt" command to the PC 103. Each MEE 106 calculates the desired final platform 23 position from the current position of its vehicle element 25. Typically this will be a small distance in the down direction. Each MEE 106 will issue command data to its brake device 30 to move to desired platform position causing threads 40 to move from being centered in gaps 26 to the point where the gap between the upper surface of each thread and the bottom landing surface 29 of the corresponding teeth 27 is about 0.040 inch. Each brake device 30 is then disabled causing servo motor 45 current to shutoff and the shaft holding brakes to engage each servo motor 45. After this move is completed, the MEE 106 indicates a "Halted" state allowing a "Release" command to be accepted.

Once the PC 103 indicates a "Halted" state (all MEEs 106 halted and brakes are set) the PLC 101 issues a "Release" command to the PC 103, which causes each MEE 106 to ramp down stator 15 current to zero and each thread 40 will set down on the a tooth 27 of the corresponding brake rail 21. On completion of the "Release", the PC 101 will once again report the "Ready for Liftoff" state and the elevator platform 23 is ready move again when the operator commands it.

Figure 16:
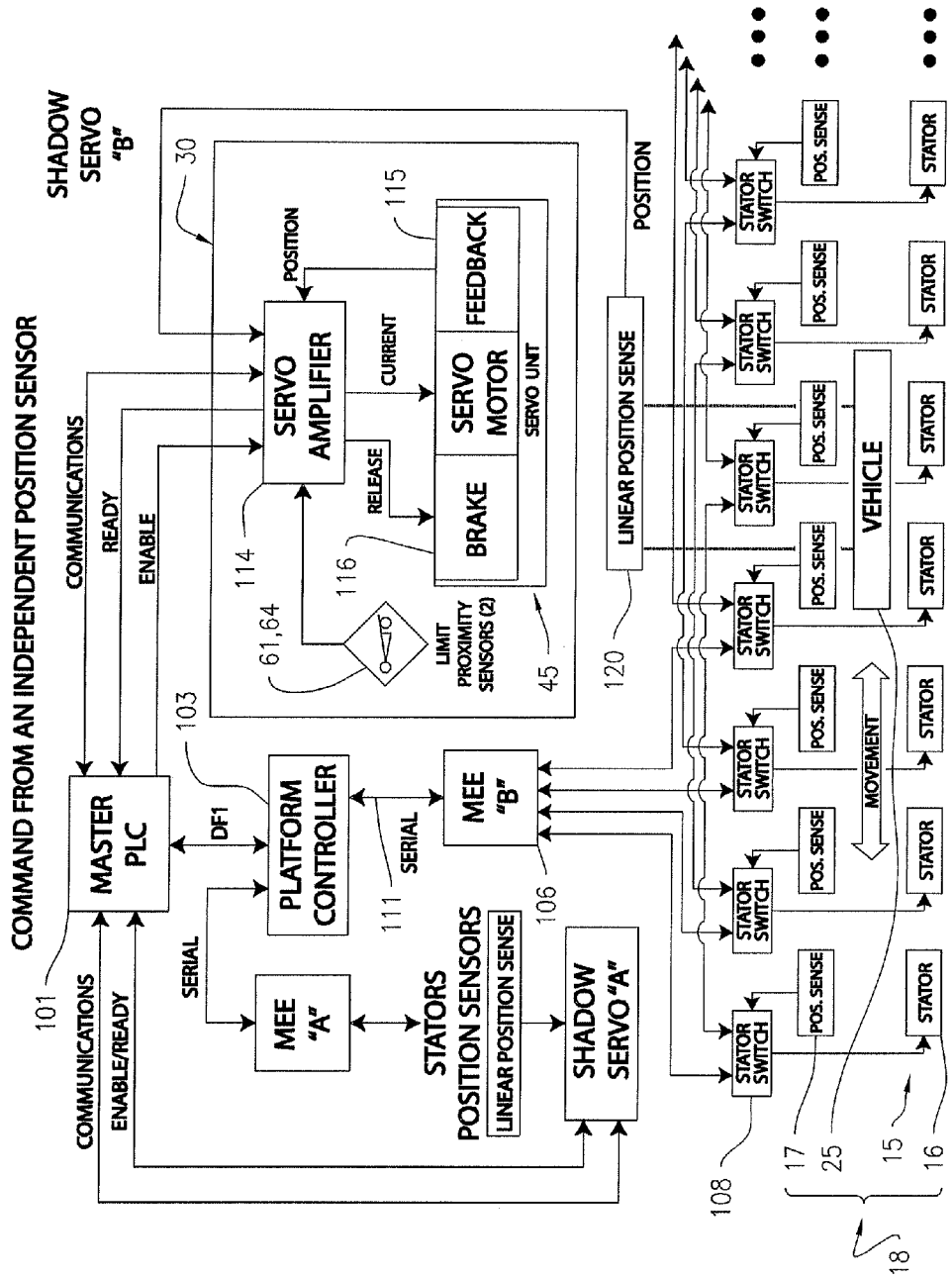
Figure 17:
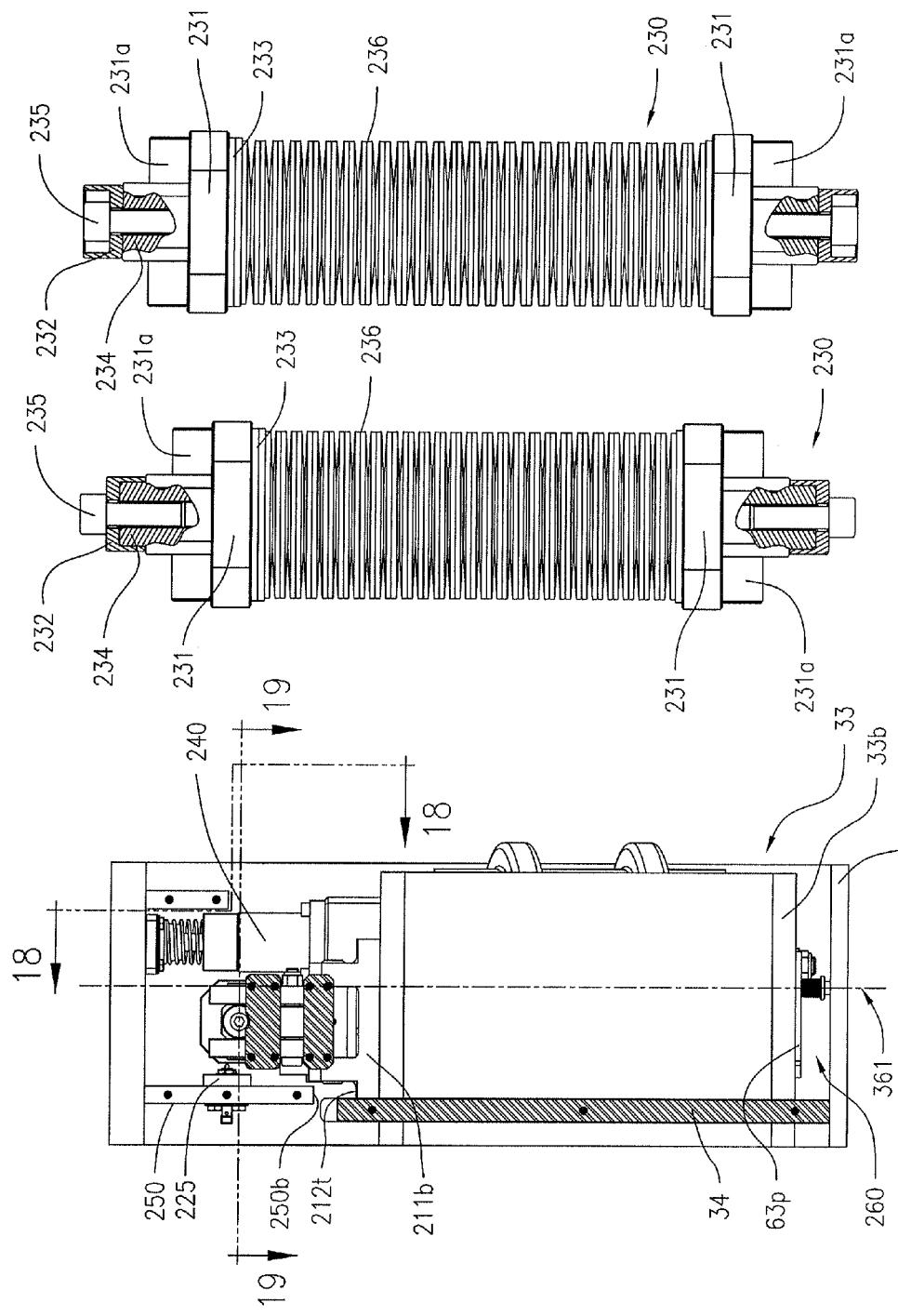
FIG. 17 shows a side elevation view of the brake apparatus of FIG. 8, as viewed through line 17-17, showing an alternative embodiment of a device for cushioning significant force impact in two directions.

Referring now to FIG. 16, shown therein is the command scenario for the control system of the invention, wherein like named and numbered elements are the same in structure and function as illustrated in FIG. 13, in the case of commands from an independent position sensor 120. For the lift off mode, the operational command sequence for the FIG. 16 scenario is the same as that described above in relation to FIG. 13 from initial operator input to successful "Lifted Off" report from PC 103 to PLC 101.

At this point, operation of the brake device 30 begins and is enabled by the PLC 101. Once enabled, each brake device 30 moves based on the position read from sensors 120. The PLC 101 checks that all servo amplifiers 114 report that they are ready for fault monitoring and shuts down the move if there is a fault. At this point, elevator platform 23 is supported by thrust from each vehicle element 25 controlled by the individual MEEs 106, and each thread 40 of the respective brake device 30 is centered in gap 26 of the corresponding brake rail 21.

When each brake device 30 completes the centering move, the system is ready for a PLC 101 generated "Move" command to the PC 103. Each brake device 30 continues to move by tracking the linear absolute position sensor(s) 120. As the MEE 106 moves the vehicle element 25, each brake rotor 35 moves simultaneously with vehicle element 25 movement. The elevator platform 23 moves with the brake rotors 35 rotating to keep each thread 40 centered in the successive gaps 26 of the corresponding brake rail 21.

Similarly to the FIG. 13 command scenario, if the actual motion of a vehicle element 25 leads or lags the commanded motion profile a prescribed excessive amount, thread 40 will contact a tooth 27 of the corresponding brake rail 21 which will be detected by a sharp rise is current required to operate the servo motor 45, or one of the proximity sensors 61, 64 will actuate. Additionally, the brake device 30 is limited to the maximum elevator rated operating speed. Should the LSMs 18 go into a "run away" condition and exceed this speed, a fault will be generated. This will trigger a fault in the PLC 101 and a "Halt" command will be issued to the PC 103 to stop elevator platform 23 movement.

If the elevator platform 23 movement stays close to the commanded motion profile, platform 23 will reach the commanded destination with brake thread(s) 40 centered in the corresponding gap(s) 26. The PLC 101 then issues a "Halt" command to the PC 103.

Each brake device 30 is then disabled causing servo motor 45 current to shutoff and the shaft holding brakes to engage each servo motor 45. Once all the shadow servo amplifiers 114 turn off their ready signals (brakes are "set"), the PLC 101 issues a "Release" command to the PC 103. This command causes each MEE 106 to ramp down stator 15 current to zero and the platform 23 and threads 40 will set down on the corresponding brake rail 21. On completion of the "Release", the PC 103 will once again report the "Ready for Liftoff" state and the elevator is ready move again when the operator commands it.

The servo controlled brake device described herein in certain exemplary embodiments may be controlled using alternative gearing arrangements other than the helical thread structure on the servo driven rotor. For example, a geared structure comprising a rotatable sprocket gear driven by the rotor, wherein the sprocket operatively engages the brake rail (21) with vertical movement of the elevator platform. Other such gearing arrangements structured for simultaneous movement with vertical movement of the elevator platform may be selected within the scope of these teachings.

Potential fault conditions may include, among others, loss of power to or communication with platform 23, loss of electrical power to any component of the elevator system, mechanical jamming of any brake device 30 with its corresponding brake rail 21 as by excess speed up or down, failure of any LSM 18, or failure of the servo motor 45 drive. In each case, almost any identified failure mode results in one or more brake rotors 35 becoming out of synch with platform 23 movement and jams on a rail 21. When a brake rotor 35 jams, it ceases rotation abruptly, halts platform 23 and faults the corresponding servo motor 45 drive.

The invention therefore provides a vertical conveyance platform structure, such as an elevator system, including a programmable servo motor control system for moving the platform and a servo controlled brake device for the platform.

Another embodiment of the present invention includes a conveyance system including a platform, apparatus or other vehicle operating along a horizontal or inclined pathway, which can be linear or curvilinear, and which includes a brake rail disposed along, and typically secured along, the pathway. The platform, apparatus or vehicle would be configured for conveyance along the pathway, and includes at least one brake device secured to the platform, apparatus or vehicle, and which is configured for synchronizing association with the brake rail. The pathway can include any structure include rails or columns, upon which a vehicle, conveyance platform, or other movable apparatus is moved. The vehicle can include platforms, elevators, and vehicles of any kind including carriages and rail cars, that move along and are typically supported for movement along and by the pathway. The vehicle typically includes a means for facilitating guidance or support of the vehicle for movement of the vehicle along the pathway, including wheels or rollers secured to the vehicle that support and guide the vehicle along the pathway, or secured along to the pathway that support and guide the vehicle, or other means of holding the vehicle in relation to the pathway, such as magnetic levitation.

It is understood that modifications to the invention may be made as might occur to one with skill in the field of the invention within the scope of the appended claims. All embodiments contemplated hereunder that achieve the benefits of the invention have therefore not been shown in complete detail. Other embodiments may be developed without departing from the spirit of the invention or from the scope of the appended claims.

What is claimed is:

1. A method for operating a movable apparatus along a structure that defines a vertical pathway, and for stopping the movable apparatus along the pathway, the movable apparatus supported for movement along the vertical pathway, comprising the steps of:
   (a) providing a brake rail secured to the structure along the vertical pathway, the brake rail having along one edge thereof a multiplicity of regularly spaced teeth that define gaps between successive teeth;

(b) providing a brake device secured to the movable apparatus, the brake device including a rotor having an outer cylindrical surface and a central axis of rotation, and including a helical thread on the outer cylindrical surface for loosely engaging the gaps in the brake rail;

(c) providing an apparatus drive mechanism for powering the vertical movement of the movable apparatus;

(d) moving under power the movable apparatus along the pathway;

(e) rotating the rotor so that the thread loosely engages successive gaps in the brake rail and out of contact with the teeth of the brake rail during movement of the moveable apparatus;

(f) moving the movable apparatus under power of the apparatus drive mechanism along the pathway to, and stopping and hovering under power at, a stop position, at which the rotor is rotationally stationary; and (g) rotating the thread of the rotor, with the moveable apparatus in the stop position, into contact and engagement with a top landing surface of a tooth on the brake rail.

2. The method according to claim 1, further including:

(g) providing a controller, signaling the apparatus drive mechanism to move the movable apparatus along the pathway, and signaling independently a servo motor to rotate the rotor with the movement of the movable apparatus along the pathway.

3. The method according to claim 2, wherein the step of signaling the apparatus drive mechanism includes signaling the apparatus drive mechanism to move vertically the moveable apparatus at a velocity or acceleration along the pathway, and the step of signaling the servo motor includes signaling the servo motor to rotate the rotor at a rotational velocity or rotational acceleration that moves the advancing thread of the rotor vertically, either upwardly or downwardly, at the exact same velocity or acceleration, at which the apparatus drive mechanism is moving the apparatus vertically along the vertical pathway.

4. The method according to claim 3, where the rotor is rotated by a servo motor operatively connected to the rotor, and the apparatus drive mechanism comprises at least one linear synchronous motor.

5. The method according to claim 4, where the controller is a programmable logic controller system.

\* \* \* \* \*